(12) United States Patent
Terashima et al.

(10) Patent No.: US 9,116,419 B2
(45) Date of Patent: Aug. 25, 2015

(54) PROJECTOR

(75) Inventors: Tetsuo Terashima, Azumino (JP); Shunsuke Hino, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 175 days.

(21) Appl. No.: 13/995,199

(22) PCT Filed: Dec. 19, 2011

(86) PCT No.: PCT/JP2011/007076
§ 371 (c)(1),
(2), (4) Date: Jun. 18, 2013

(87) PCT Pub. No.: WO2012/095926
PCT Pub. Date: Jul. 19, 2012

(65) Prior Publication Data
US 2013/0271736 A1 Oct. 17, 2013

(30) Foreign Application Priority Data
Jan. 11, 2011 (JP) .................................. 2011-003363

(51) Int. Cl.
| | |
|---|---|
| *G03B 21/16* | (2006.01) |
| *G03B 21/14* | (2006.01) |
| *H04N 9/31* | (2006.01) |
| *G03B 21/20* | (2006.01) |

(52) U.S. Cl.
CPC .............. *G03B 21/14* (2013.01); *G03B 21/16* (2013.01); *G03B 21/2026* (2013.01); *G03B 21/2053* (2013.01); *H04N 9/3144* (2013.01)

(58) Field of Classification Search
CPC ............................. G03B 21/01; G03B 21/16
USPC ........... 353/52, 54, 57–58, 60–61, 94, 98–99, 353/119; 362/218, 264, 294
See application file for complete search history.

(56) References Cited

U.S. PATENT DOCUMENTS

| | | | | |
|---|---|---|---|---|
| 6,111,630 A | * | 8/2000 | Watanuki et al. | ............. 349/161 |
| 6,481,854 B1 | * | 11/2002 | Sugawara et al. | ............... 353/52 |
| 6,513,936 B1 | * | 2/2003 | Ishiwa et al. | ..................... 353/56 |
| 2002/0030794 A1 | * | 3/2002 | Hosoda et al. | .................. 353/57 |
| 2005/0157269 A1 | * | 7/2005 | Seto et al. | ........................ 353/61 |
| 2005/0219471 A1 | * | 10/2005 | Kitabayashi | .................... 353/54 |
| 2006/0066818 A1 | * | 3/2006 | Nakamura et al. | ............. 353/97 |
| 2007/0046904 A1 | | 3/2007 | Rudolph et al. | |
| 2010/0118542 A1 | * | 5/2010 | Keen | ............................. 362/294 |
| 2010/0302463 A1 | * | 12/2010 | Matsumoto | ................... 348/744 |

FOREIGN PATENT DOCUMENTS

| | | |
|---|---|---|
| JP | A-2000-15288 | 1/2001 |
| JP | A-2002-341442 | 11/2002 |
| JP | A-2003-295320 | 10/2003 |
| JP | A-2003-322912 | 11/2003 |
| JP | A-2006-40961 | 2/2006 |
| JP | A-2006-73537 | 3/2006 |

OTHER PUBLICATIONS

International Search Report issued in International Patent Application No. PCT/JP2011/007076 mailed May 10, 2012.

* cited by examiner

*Primary Examiner* — Sultan Chowdhury
(74) *Attorney, Agent, or Firm* — Oliff PLC

(57) ABSTRACT

A projector includes a light source lamp, a lighting control unit adapted to supply a lamp electric power to turn on the light source lamp, a cooling unit adapted to send a cooling fluid to cool the light source lamp, and a start control unit adapted to, from the start of turn-on of the light source lamp until a predetermined period elapses, adjust at least one of the length of the predetermined period and a limited flow rate, which is the flow rate of the cooling fluid per unit time sent from the cooling unit within the predetermined period, on the basis of an operation history of the light source lamp to control the operation of the cooling unit.

13 Claims, 13 Drawing Sheets

Fig. 3

START: HIGH POWER MODE

| BEFORE-TURN-OFF POWER VALUE (W) | PATTERN A | | PATTERN B | |
|---|---|---|---|---|
| | VOLTAGE (V) | PERIOD (s) | VOLTAGE (V) | PERIOD (s) |
| 230 W (HIGH POWER MODE) | 4 | 30 | 10 | 75 |
| 160 W (INTERMEDIATE POWER MODE) | 4 | 35 | 8.5 | 75 |
| 70 W (LOW POWER MODE) | 4 | 75 | 4 | 75 |

Fig. 6

START: HIGH POWER MODE

| AVERAGE RATED POWER RATIO (%) | PATTERN A | | PATTERN B | |
|---|---|---|---|---|
| | VOLTAGE (V) | PERIOD (s) | VOLTAGE (V) | PERIOD (s) |
| 100 | 4 | 30 | 10 | 75 |
| 85 | 4 | 35 | 8.5 | 75 |
| 60 | 4 | 50 | 6 | 75 |
| 40 | 4 | 75 | 4 | 75 |

Fig. 7

START: HIGH POWER MODE
TURN-OFF: HIGH POWER MODE

| LAMP VOLTAGE VALUE (V) | PATTERN A | | PATTERN B | |
|---|---|---|---|---|
| | VOLTAGE (V) | PERIOD (s) | VOLTAGE (V) | PERIOD (s) |
| 50 | 4 | 75 | 4 | 75 |
| 60 | 4 | 50 | 6 | 75 |
| 70 | 4 | 35 | 8.5 | 75 |
| 80 | 4 | 30 | 10 | 75 |

Fig. 9

START: HIGH POWER MODE

| GLOW DISCHARGE PERIOD (s) | PATTERN A | | PATTERN B | |
|---|---|---|---|---|
| | VOLTAGE (V) | PERIOD (s) | VOLTAGE (V) | PERIOD (s) |
| 0.25 | 4 | 30 | 10 | 75 |
| 0.75 | 4 | 35 | 8.5 | 75 |
| 1.5 | 4 | 75 | 4 | 75 |

Fig. 12

START: HIGH POWER MODE

| AFTER-DIELECTRIC BREAKDOWN VOLTAGE VALUE (V) | PATTERN A | | PATTERN B | |
|---|---|---|---|---|
| | VOLTAGE (V) | PERIOD (s) | VOLTAGE (V) | PERIOD (s) |
| 60 | 4 | 30 | 10 | 75 |
| 40 | 4 | 35 | 8.5 | 75 |
| 30 | 4 | 75 | 4 | 75 |

PROJECTOR

TECHNICAL FIELD

The present invention relates to a projector.

BACKGROUND ART

In the related art, a projector is known which modulates a light beam emitted from a light source to form an image based on image information, and projects the image on a magnified scale onto a screen to be projected, such as a screen. As the light source, a light source lamp, such as an ultrahigh pressure mercury lamp, is used which includes a light-emitting tube having a discharge space, in which a pair of electrodes and a light-emitting material, such as mercury, are sealed.

In this projector, for the purpose of reducing power consumption or reducing noise of a fan which sends cooling air to the light source lamp, a low power mode may be used in which power lower than rated power supplied in a normal power mode is supplied to turn on the light source lamp. In this case, in the projector, the light source lamp and the fan are driven on the basis of lamp electric power and the rotational speed of the fan set in advance in accordance with each mode.

In the low power mode, since lamp electric power supplied to the light source lamp is low, the period until the temperature of the light source lamp reaches the temperature appropriate for turn-on in the low power mode is extended compared to the normal power mode. For this reason, when the light source lamp will be started in the low power mode, there is a problem in that it takes a lot of time to obtain desired brightness.

On the other hand, a projector is known in which rated power is supplied to the light source lamp until a set time elapses from the start of the light source lamp in the low power mode, and the fan is driven at the rotational speed according to the low power mode (for example, see PTL 1). In this projector, if the set time has elapsed, lamp electric power according to the low power mode is supplied to the light source lamp. Thus, at the time of the start in the low power mode, it is possible to reduce the time when the temperature of the light source lamp reaches the appropriate temperature.

In this projector, when the light source lamp starts in the normal power mode, the fan is driven at the rotational speed according to the normal power mode.

CITATION LIST

Patent Literature

[PTL 1] JP-A-2003-295320

SUMMARY OF INVENTION

Technical Problem

When the temperature in the discharge space falls below a saturation threshold value (the temperature at which mercury in the discharge space is substantially entirely in the form of vapor), a halogen cycle in which tungsten evaporated from an electrode returns to the electrode does not function appropriately, and the phenomenon that tungsten is attached to the inner wall of the light-emitting tube, that is, blackening is likely to occur. Blackening causes a decrease in luminance of the light source lamp and shortens the lifetime of the light source lamp. In a state where the temperature in the discharge space exceeds the saturation threshold value, and the halogen cycle functions appropriately, accumulated blackening is likely to be eliminated.

On the other hand, in the projector described in PTL 1, when the turn-on of the light source lamp starts, the temperature of the light source lamp temporarily increases. In this case, however, the temperature in the discharge space may not increase to the temperature at which accumulated blackening can be eliminated, such that the effects of eliminating blackening and suppressing the accumulation may not be obtained. If the set time is set uniformly, unnecessary overheating of the light source lamp may occur, and devitrification or blowing of the light source lamp may be stimulated.

For this reason, there is a need for a projector capable of suppressing the accumulation of blackening.

Solution to Problem

An advantage of some aspects of the invention is to provide a projector capable of suppressing the accumulation of blackening.

An aspect of the invention is directed to a projector including a light source lamp, a lighting control unit adapted to supply a lamp electric power to turn on the light source lamp, a cooling unit adapted to send a cooling fluid to cool the light source lamp, and a start control unit adapted to, from the start of turn-on of the light source lamp until a predetermined period elapses, adjust at least one of the length of the predetermined period and a limited flow rate, which is the flow rate of the cooling fluid per unit time sent from the cooling unit within the predetermined period, on the basis of an operation history of the light source lamp to control the operation of the cooling unit.

According to the aspect of the invention, the start control unit adjusts at least one of the length of the predetermined period when the cooling fluid at a flow rate according to lamp electric power is sent from the start of turn-on of the light source lamp and the limited flow rate, which is the flow rate of the cooling fluid per unit time to be set within the predetermined period, on the basis of the operation history of the light source lamp. That is, when the light source lamp is turned on under the condition that blackening is likely to be generated and accumulated or when the light source lamp will be turned on under the above-described condition, the limited flow rate is adjusted to be smaller than the set flow rate or a limited period in which cooling air at a low flow rate according to the limited flow rate is adjusted to be extended such that the temperature of the light source lamp increases to the temperature at which blackening is eliminated. Thus, it is possible to perform a process for eliminating blackening at the time of turn-on of the light source lamp. Therefore, it is possible to suppress the accumulation of blackening in the light source lamp.

In the aspect of the invention, it is preferred that the projector further includes a normal control unit adapted to control the cooling unit such that the cooling fluid at a set flow rate set in advance in accordance with lamp electric power is sent to the light source lamp after the predetermined period has elapsed.

According to this configuration, after the limited period set to such an extent that blackening is eliminated has elapsed, the normal control unit performs control such that the cooling unit sends the cooling fluid at the set flow rate according to lamp electric power to the light source lamp, thereby suppressing an unnecessary increase in temperature of the light source lamp. Therefore, it is possible to allow the light source lamp to be stably turned on and to suppress the occurrence of devitrification or blowing in the light source lamp.

In the aspect of the invention, it is preferred that the start control unit adjusts at least one of the length of the predetermined period and the limited flow rate in accordance with the operation history and lamp electric power supplied to the light source lamp.

There is an association between lamp electric power supplied to the light source lamp and the state where blackening is likely to be generated and accumulated. For this reason, in the aspect of the invention, at least one of the predetermined period and the limited flow rate is adjusted in accordance with the operation history and lamp electric power, thereby reliably suppressing the accumulation of blackening in the light source lamp.

In the aspect of the invention, it is preferred that the operation history is the power value of lamp electric power supplied to the light source lamp before the light source lamp is turned off.

The power value of lamp electric power before turn-off is associated with the temperature of the light source lamp before turn-off. When the power value is high, the temperature of the light source lamp is high, and when the power value is low, the temperature of the light source lamp is low. A state where the temperature of the light source lamp is low refers to a state where blackening is likely to be generated and accumulated.

For this reason, in the above configuration, the length of the predetermined period and the limited flow rate are adjusted on the basis of the power value of lamp electric power supplied to the light source lamp before turn-off. Thus, when the power value of lamp electric power at the time of turn-off is low, it is possible to allow the temperature of the light source lamp to increase to the temperature at which blackening is eliminated. Therefore, it is possible to shorten the time when the desired brightness is reached and to more reliably suppress the accumulation of blackening.

Alternatively, in the aspect of the invention, it is preferred that the operation history is the ratio of a rated power value of the light source lamp and an average power value of lamp electric power supplied to the light source lamp before the light source lamp is turned off.

The ratio of the average power value to the rated power value is associated with the temperature of the light source lamp before turn-off. For example, when the ratio is high, this indicates that lamp electric power close to rated power is supplied to the light source lamp. In this case, the average temperature of the light source lamp is high, and blackening is generated with difficulty. Meanwhile, when the ratio is low, this indicates that lamp electric power lower than rated power is supplied. In this case, the average temperature of the light source lamp is low, and blackening is easily generated.

For this reason, in the above configuration, the length of the predetermined period and the limited flow rate are adjusted on the basis of the ratio. Thus, similarly to the above-described case based on the power value of lamp electric power, it is possible to allow the temperature of the light source lamp to reliably increase to the temperature at which blackening is eliminated. Therefore, it is possible to more reliably suppress the accumulation of blackening.

Alternatively, in the aspect of the invention, it is preferred that the operation history is the voltage value of lamp electric power supplied to the light source lamp before the light source lamp is turned off.

The voltage value of lamp electric power before turn-off becomes the index of measuring the generation state of blackening. For example, when the voltage value is high, this indicates that the amount of evaporation of the electrode component (tungsten) of the light source lamp does not increase. Meanwhile, when the voltage value is low, this indicates that the temperature of the electrode tip increases and the amount of evaporation of the electrode component increases, such that blackening is likely to be generated.

For this reason, in the above configuration, the length of the predetermined period and the limited flow rate are adjusted on the basis of the voltage value. Thus, similarly to the above-described case, when the light source lamp is turned on in a state where blackening is likely to be generated, it is possible to allow the temperature of the light source lamp to reliably increase to the temperature at which blackening is eliminated at the time of the start of next turn-on. Therefore, it is possible to more reliably suppress the accumulation of blackening.

In the aspect of the invention, it is preferred that the light source lamp has a discharge space in which a pair of electrodes and a discharge material are sealed, after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes, and the start control unit adjusts at least one of the length of the predetermined period and the limited flow rate in accordance with the length of the glow discharge period.

If the glow discharge period is long, the period in which the electrode receives a sputter by ions is extended. For this reason, the electrode component is likely to be evaporated, and blackening is likely to be generated. The glow discharge period can be determined by, for example, the time at which a lamp current after insulation breakdown has reached to a predetermined current value, or the like.

For this reason, in the above configuration, the length of the predetermined period and the limited flow rate are adjusted on the basis of the glow discharge period. Thus, similarly to the above-described case, at the time of the start of turn-on of the light source lamp in which the accumulation of blackening is expected, it is possible to allow the temperature of the light source lamp to reliably increase to the temperature at which accumulated blackening is eliminated. Therefore, it is possible to more reliably suppress the accumulation of blackening.

In the aspect of the invention, it is preferred that the light source lamp has a discharge space in which a pair of electrodes and a discharge material are sealed, and after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes. The cooling control unit may adjust at least one of the length of the predetermined period and the limited flow rate in accordance with lamp electric power if a cumulative turn-on time of the light source lamp is smaller than a predetermined time, and may adjust at least one of the length of the predetermined period and the limited flow rate in accordance with the length of the glow discharge period if the cumulative turn-on time is equal to or greater than the predetermined time.

Depending on the state of the light source lamp (for example, the deterioration state of the electrode), it may be effective to set lamp electric power as an index when at least one of the length of the predetermined period and the limited flow rate are adjusted or it may be effective to set the length of the glow discharge period as the index.

For example, if an arc length which is formed between the electrodes at the time of normal turn-on is shortened, the current value increases, and blackening is likely to be generated. Meanwhile, if the arc length is shortened and the current value increases, a transition to arc discharge is easily made, and the glow discharge period is shortened. In this case, the period in which the above-described sputter is generated is shortened, and blackening is generated with difficulty. The importance of the factor for which blackening is likely to be generated changes depending on the state of the light source lamp.

In a comparatively first half period of the lifetime of the light source lamp, when the arc length is shortened, there is a great influence on blackening being likely to be generated compared to a case where the glow discharge period increases. In a comparatively second half period, the relationship is reversed.

For this reason, in the above configuration, when the cumulative turn-on time of the light source lamp is smaller than the predetermined time, at least one of the length of the predetermined period and the limited flow rate is adjusted in accordance with lamp electric power. When the cumulative turn-on time is equal to or greater than the predetermined time, the adjustment is done in accordance with the length of the glow discharge period. Thus, it is possible to perform effective cooling control of the light source lamp according to the state of the light source lamp. Therefore, it is possible to more reliably suppress the accumulation of blackening.

Alternatively, in the aspect of the invention, it is preferred that the light source lamp has a discharge space in which a pair of electrodes and a discharge material are sealed, and after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes. The cooling control unit may adjust at least one of the length of the predetermined period and the limited flow rate in accordance with lamp electric power if the voltage value of lamp electric power supplied to the light source lamp before the light source lamp is turned off is lower than a predetermined value, and may adjust at least one of the length of the predetermined period and the limited flow rate in accordance with the length of the glow discharge period if the voltage value is equal to or greater than the predetermined value.

The lower the voltage value of lamp electric power and the longer the period in which lamp electric power having the voltage value is supplied, the shorter the arc length is. That is, when the voltage value is comparatively low, if the arc length is extended, there is a great influence on the generation of blackening compared to a case where the glow discharge period is extended. When the voltage value is comparatively high, if the glow discharge period is extended, there is a great influence on the generation of blackening compared to a case where the arc length is extended.

For this reason, in the above configuration, when the voltage value of lamp electric power at the time of normal turn-on before turn-off is lower than the predetermined value, at least one of the length of the predetermined period and the limited flow rate is adjusted in accordance with lamp electric power. When the voltage value is equal to or greater than the predetermined value, the adjustment is done in accordance with the glow discharge period. In this case, it is possible to perform effective cooling control of the light source lamp according to the state of the light source lamp. Therefore, it is possible to more reliably suppress the accumulation of blackening.

Alternatively, in the aspect of the invention, it is preferred that the light source lamp has a discharge space in which a pair of electrodes and a discharge material are sealed, and after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes. The cooling control unit may adjust at least one of the length of the predetermined period and the limited flow rate in accordance with lamp electric power if the turn-on time of the light source lamp immediately before the light source lamp is turned off is equal to or greater than a predetermined time, and may adjust at least one of the length of the predetermined period and the limited flow rate in accordance with the length of the glow discharge period if the turn-on time is smaller than the predetermined time.

In a state where the turn-on and turn-off of the light source lamp are frequently repeated, the length of the glow discharge period has a great influence on the generation of blackening.

For this reason, in the above configuration, when the turn-on time of the light source lamp before turn-off (the previous turn-on time of the light source lamp) is equal to or greater than the predetermined time, it is determined that the turn-on and turn-off of the light source lamp are not frequently repeated, and at least one of the length of the predetermined period and the limited flow rate is adjusted in accordance with lamp electric power. Meanwhile, when the turn-on time is smaller than the predetermined time, it is determined that the turn-on and turn-off of the light source lamp are frequently repeated, and the adjustment is done in accordance with the glow discharge period. In this case, it is possible to perform effective cooling control of the light source lamp according to the state of the light source lamp. Therefore, it is possible to more reliably suppress the accumulation of blackening.

In the aspect of the invention, it is preferred that the light source lamp has a discharge space in which a pair of electrodes and a discharge material are sealed, and the start control unit adjusts at least one of the length of the predetermined period and the limited flow rate on the basis of, as the operation history, the voltage value of lamp electric power supplied to the light source lamp after insulation breakdown in which insulation is broken between a pair of electrodes.

When the light source lamp is restarted (in the case of hot restart), an increase in power of the light source lamp is rapidly done. For this reason, since an increase in temperature of the light source lamp is fast, it is necessary to adjust the sum of the flow rate of cooling air sent to the light source lamp from the start of turn-on such that the temperature of the light source lamp does not increase excessively.

Meanwhile, in the case of hot restart, since the internal pressure of the light source lamp increases, insulation breakdown occurs with difficulty. For this factor, the flow rate of the cooling fluid may increase on the basis of the voltage value of lamp electric power for a while from when the restart starts.

The determination on hot restart or not can be done on the basis of the voltage value of lamp electric power after insulation breakdown.

For this reason, in the above configuration, when it is determined to be hot restart on the basis of the voltage value of lamp electric power after insulation breakdown, the length of the predetermined period and the limited flow rate are adjusted, thereby suppressing an excessive increase in temperature of the light source lamp. Therefore, it is possible to stabilize the turn-on of the light source lamp, to suppress the occurrence of devitrification and blowing, and to achieve the long lifetime of the light source lamp.

In the aspect of the invention, it is preferred that the projector further includes a storage unit for storing the operation history of the light source lamp in association with driving information of the cooling unit according to the length of the predetermined period and the limited flow rate. The start control unit may acquire the length of the predetermined period and the driving information according to the operation history of the light source lamp from the storage unit, and may put the cooling unit into operation.

According to the above configuration, the length of the predetermined period and the driving information of the cooling unit stored in the storage unit are acquired on the basis of the operation history of the light source lamp. Thus, in order to put the cooling unit into operation, a process for calculating the length of the predetermined period and the limited flow rate by an arithmetic operation can be omitted. Therefore, it is possible to simplify the process of the start control unit and to appropriately put the cooling unit into operation.

In the aspect of the invention, it is preferred that the cooling unit includes a fan which sends the cooling fluid, and the driving information is a fan voltage value which is supplied to the fan.

According to the above configuration, the fan voltage value is stored in the storage unit as the driving information along with the length of the predetermined period. Thus, the start control unit can control the operation of the fan using information acquired from the storage unit. Therefore, it is possible to further simplify the process of the start control unit.

BRIEF DESCRIPTION OF DRAWINGS

FIG. 3 is a diagram showing an example of a start parameter table in the above-described embodiment.

FIG. 6 is a diagram showing an example of a start parameter table according to a second embodiment of the invention.

FIG. 7 is a diagram showing an example of a start parameter table according to a third embodiment of the invention.

FIG. 9 is a diagram showing an example of a start parameter table in the above-described embodiment.

FIG. 12 is a diagram showing an example of a restart parameter table according to an eighth embodiment of the invention.

DESCRIPTION OF EMBODIMENTS

First Embodiment

Hereinafter, a first embodiment of the invention will be described with reference to the drawings.

Figure 1:
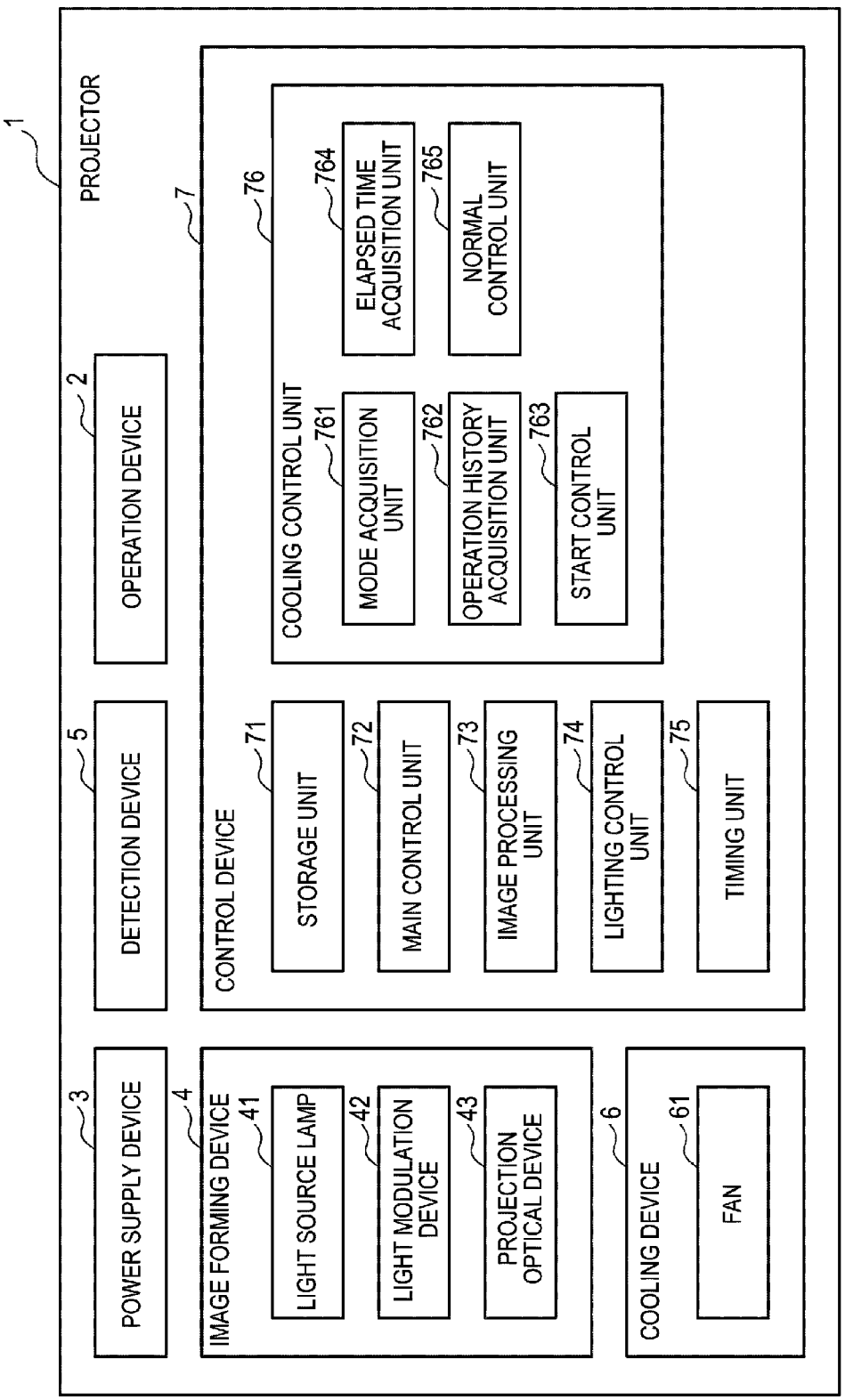
FIG. 1 is a block diagram showing the configuration of a projector according to a first embodiment of the invention.

FIG. 1 is a block diagram showing the configuration of a projector 1 of this embodiment.

The projector 1 of this embodiment modulates a light beam emitted from a light source in accordance with image information, and projects the image on a projection screen, such as a screen, on a magnified scale. Though the details will be described below, in order to eliminate blackening accumulated in a light source lamp serving as a light source, the projector 1 temporarily increases the temperature of the light source lamp (specifically, the temperature in the discharge space) to a temperature higher than an optimum temperature on the basis of the operation state of the light source lamp at the time of the start of turn-on.

Specifically, in the projector 1, a limited period in which the flow rate of a cooling fluid (cooling air) sent to the light source lamp falls below a set flow rate according to lamp electric power is provided on the basis of the operation history of the light source lamp, thereby limiting cooling of the light source lamp to increase the temperature in the discharge space. The limited period corresponds to a predetermined period according to the invention.

As shown in FIG. 1, the projector 1 includes an operating device 2, a power supply device 3, an image forming apparatus 4, a detection device 5, a cooling device 6, and a control device 7.

The operating device 2 is constituted by an operating panel provided in the top surface or the like of the projector 1. The operating panel is provided with a plurality of keys. The operating panel outputs an operating signal according to an input key to the control device 7. The keys include a power key which is used to power on/off the projector 1, a switch key which is used to switch the operation mode of the light source lamp for reduction in power consumption or the like, a mute key which is used to display a mute image instead of display of an image according to image information input from the outside, and the like.

The power supply device 3 supplies power to each electronic part constituting the projector 1. Specifically, the power supply device 3 supplies power to the control device 7 and also supplies power to each electronic part (for example, a light source lamp 411 described below) under the control of the control device 7.

Figure 2:
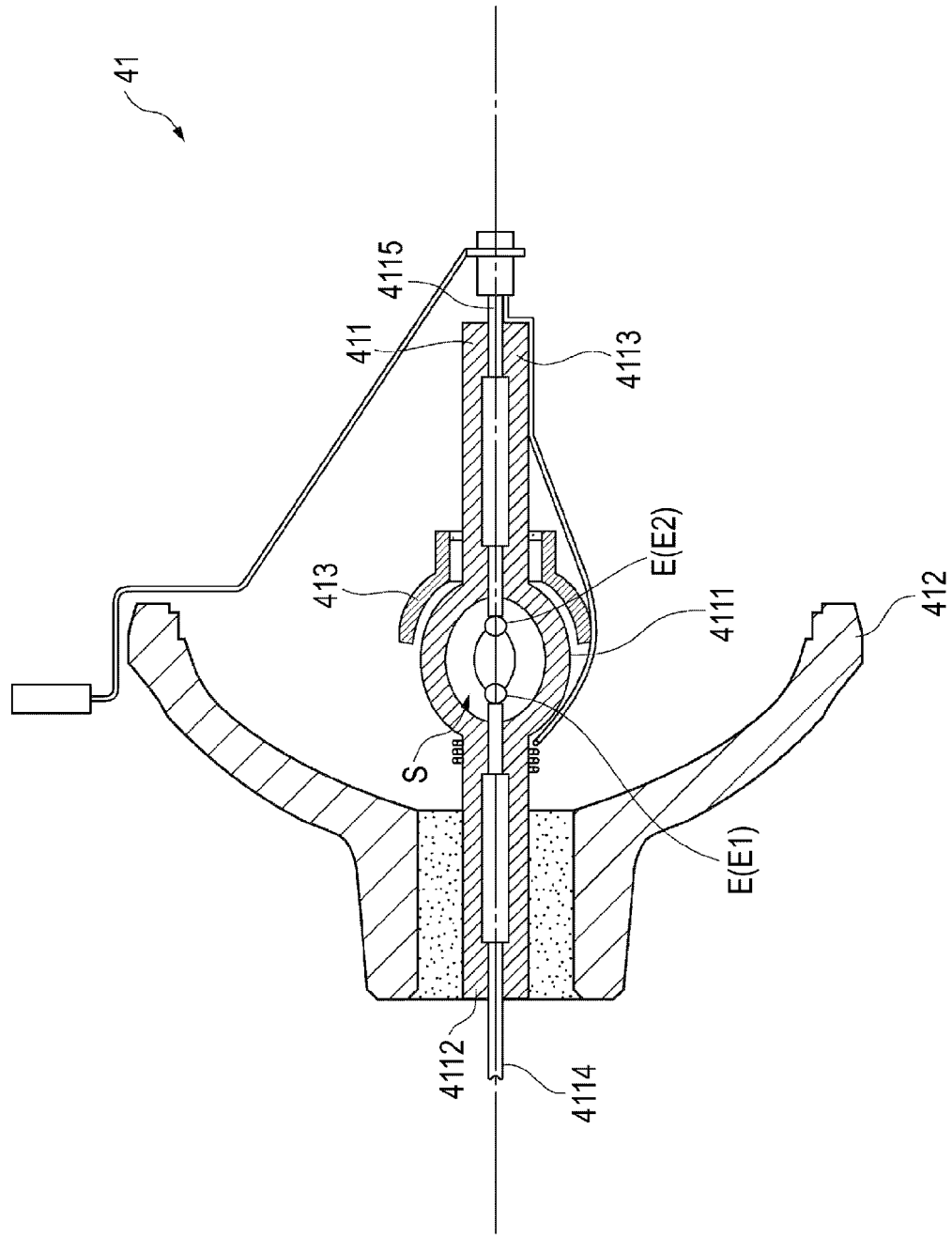
FIG. 2 is a sectional view showing a light source device in the above-described embodiment.

Though not shown, the power supply device 3 includes a down-converter, an inverter circuit, and an igniter circuit so as to turn on the light source lamp 411 (see FIG. 2).

The down-converter removes high-frequency noise, and also deboosts and rectifies a supplied direct current.

The inverter circuit converts a direct current to a square-wave alternating current.

The igniter circuit applies a high-voltage pulse to electrodes E of the light source lamp 411 to perform insulation breakdown between the electrodes E, and requests to start the light source lamp 411.

FIG. 2 is a sectional view showing a light source device 41.

The image forming apparatus 4 modulates a light beam in accordance with a driving signal input from the control device 7, and projects the image on the projection screen on a magnified scale. The image forming apparatus 4 includes a light source device 41, a light modulation device 42, and a projection optical device 43.

As shown in FIG. 2, the light source device 41 includes a light source lamp 411, and a main reflecting mirror 412 and a sub reflecting mirror 413 which are attached to the light source lamp 411.

Of these, the light source lamp 411 includes a light-emitting portion 4111 which has a discharge space S, in which a pair of electrodes E (E1, E2) and a light-emitting material are sealed, sealing portions 4112 and 4113 which extend in opposing directions from the light-emitting portion 4111, and lead wires 4114 and 4115 which have one end connected to the electrodes E and another end extending outside the light source lamp 411.

Though the details will be described below, the light source lamp 411 is turned on with luminance according to lamp electric power supplied from the power supply device 3.

Returning to FIG. 1, the light modulation device 42 modulates a light beam emitted from the light source lamp 411 to modulate the light beam in accordance with the driving signal. For the light modulation device 42, a transmissive or reflective liquid crystal panel may be used, or a device using micro-mirrors or the like may be used.

The projection optical device 43 projects the modulated light beam on a magnified scale, and is constituted by a combination lens including a lens barrel and a plurality of lenses accommodated in the lens barrel.

The detection device 5 is connected to the power supply device 3, and detects the voltage value and current value of lamp electric power supplied by the power supply device 3. The detection device 5 outputs the detected voltage value and current value to the control device 7.

The cooling device 6 sends cooling air introduced from the outside of the projector 1 to various heat-generating parts constituting the projector 1, and cools the heat-generating parts. For example, the cooling device 6 sends cooling air to the light source lamp 411 to cool the light source lamp 411. The cooling device 6 has a fan 61 which ejects cooling air, and the fan 61 is driven at a rotational speed (the number of rotations per unit time) according to the voltage value of a fan voltage supplied from the control device 7.

Configuration of Control Device

The control device 7 is constituted by a circuit board on which a CPU (Central Processing Unit), a RAM (Random Access Memory), a flash memory, and the like are mounted, and controls the operation of the projector 1 in accordance with the operating signal input from the operating device 2 or autonomously.

The control device 7 has a storage unit 71 constituted by a flash memory, and a main control unit 72, an image processing unit 73, a lighting control unit 74, a timing unit 75, and a cooling control unit 76 which are realized when the CPU processes programs and data stored in the storage unit 71.

Configuration of Storage Unit

The storage unit 71 stores various programs and data necessary for the operation of the projector 1. For example, the storage unit 71 stores a driving parameter table for driving the cooling device 6 as data. In the driving parameter table, driving parameters set in advance are set on the basis of the flow rate (a set flow rate according to the lamp electric power value) of cooling air to be sent to the light source lamp 411 for each operation mode of the light source lamp 411. When the driving of the fan 61 is controlled by an application voltage level, the driving parameters are stored as fan voltage values according to the operation modes. When the driving of the fan is controlled by PWM (Pulse Width Modulation), the driving parameters are stored as duty ratios for the respective operation modes.

In the following description, description will be provided as a case where the driving of the fan 61 is controlled by the application voltage level.

The storage unit 71 stores the operation history of the light source lamp 411. In this embodiment, the storage unit 71 stores the lamp electric power value at the time of power-off of the projector 1, that is, at the time of turn-off of the light source lamp 411 under the control of the main control unit 72 described below.

The storage unit 71 stores a start parameter table in which for each operation mode at the time of the start of turn-on of the light source lamp 411, the operation history (a power value at the time of previous turn-off) of the light source lamp 411 is associated with the limited period and driving information (the fan voltage value of the fan 61) of the cooling device 6 to be applied within the limited period.

The limited period is the period from the start of turn-on of the light source lamp 411 until the cooling fluid at the set flow rate according to the lamp electric power value supplied to the light source lamp 411 is sent. In other words, the limited period is the period from the start of turn-on of the light source lamp 411 until the cooling device 6 is operated by the driving parameters according to the lamp electric power value supplied to the light source lamp 411, and the period in which the start parameters are applied.

FIG. 3 is a diagram showing an example of a start parameter table. FIG. 3 shows a start parameter table which is applied when the turn-on of the light source lamp 411 is started in a high power mode.

As shown in FIG. 3, in the start parameter table, a start parameter of a pattern A and a start parameter of a pattern B are set.

In the start parameter of the pattern A, a constant fan voltage value is set, and a different limited period for each power value at the time of previous turn-off is set. In the pattern A, the higher the power value at the time of previous turn-off, the shorter the limited period is set. To the contrary, the lower the power value at the time of previous turn-off, the longer the limited period is set.

In the start parameter of the pattern B, a constant limited period is set, and a different fan voltage value for each power value at the time of previous turn-off is set. In the pattern B, the higher the power value at the time of previous turn-off, the higher the fan voltage value is set. The lower the power value at the time of previous turn-off, the lower the fan voltage value is set.

The limited period is set to be longer than the period when the light source lamp 411 reaches a turn-on state with target power after insulation breakdown. The fan voltage values are set to be equal to or smaller than a fan voltage value for sending cooling air at the set flow rate according to the lamp electric power value supplied to the light source lamp 411. That is, the fan voltage value is lower than the fan voltage values of the driving parameters.

In the start parameter table, at the time of the start in the high power mode, a limited period is set to be shorter with a constant fan voltage value in the pattern A, and a fan voltage value is set to be higher with a constant time limit in the pattern B. This is to prevent the temperature of the light source lamp 411 from increasing unnecessarily while an increase in temperature of the light source lamp 411 and elimination of accumulated blackening are rapidly done by lamp electric power being supplied.

In the table, at the time of the start in a low power mode, a limited period is set to be longer with a constant fan voltage value in the pattern A, and a fan voltage value is set to be lower with a constant limited period in the pattern B. This is to extend the period for eliminating accumulated blackening because an increase in temperature of the light source lamp 411 by lamp electric power being supplied is not rapidly done.

Configuration of Main Control Unit

The main control unit 72 controls the operation of the control device 7 and consequently controls the overall operation of the projector 1.

For example, the main control unit 72 sets the operation mode of the light source lamp 411 on the basis of the performance state of the mute function and the input of the switch key, and outputs a control signal to the lighting control unit 74 such that lamp electric power having a power value according to the operation mode is supplied to the light source lamp 411. The operation modes include a high power mode in which the light source lamp 411 is turned on with rated power, an intermediate power mode in which the light source lamp 411 is turned on with lamp electric power having a power value lower than rated power, a low power mode when the mute function (display of a mute image) is performed, and the like. In this embodiment, target power is set to 230 W, 160 W, and 70 W respectively in the operation modes of high power, intermediate power, and low power, and lamp electric power having these power values are supplied to the light source lamp 411. Target power in each operation mode may be appropriately set in accordance with the type of the light source lamp 411, a power supply function of the power supply device 3, or the like.

When the power key is input and the projector 1 is powered off, the main control unit 72 stores the lamp electric power value supplied to the light source lamp 411 in the storage unit 71.

Configuration of Image Processing Unit

The image processing unit 73 converts image information (including an image signal and image data), which is received from an external apparatus, such as a PC to image information corresponding to the image forming apparatus 4 under the control of the main control unit 72. At this time, the image processing unit 73 performs a predetermined correction process on the image information. The image processing unit 73 outputs a driving signal based on the image information subjected to the correction process to the image forming apparatus 4.

Configuration of Lighting Control Unit and Timing Unit

The lighting control unit 74 performs control such that the operation of the power supply device 3 supplies lamp electric power in an operation mode based on a control signal from the main control unit 72 to the light source lamp 411 to turn on the light source lamp 411.

The timing unit 75 measures the elapsed time from the start of turn-on of the light source lamp 411 under the control of the main control unit 72.

Configuration of Cooling Control Unit

The cooling control unit 76 performs control such that the cooling device 6 sends cooling air for cooling the constituent parts of the projector 1. In particular, the cooling control unit 76 performs control on the basis of the control signal input from the main control unit 72 such that the cooling device 6 sends cooling air for cooling the light source lamp 411. At this time, the cooling control unit 76 provides the limited period at the time of the start of turn-on of the light source lamp 411, such that an increase in temperature of the light source lamp 411 is rapidly done, thereby shortening the time when the desired brightness is reached and eliminating blackening generated in the discharge space S of the light source lamp 411.

In order to realize this function, the cooling control unit 76 has a mode acquisition unit 761, an operation history acquisition unit 762, a start control unit 763, an elapsed time determination unit 764, and a normal control unit 765.

The mode acquisition unit 761 acquires the operation mode at the time of the start of turn-on of the light source lamp 411 indicated by a control signal input from the main control unit 72 (the same as the control signal input to the lighting control unit 74).

The operation history acquisition unit 762 acquires the operation history (in this embodiment, the lamp electric power value at the time of previous turn-off) of the light source lamp 411 stored in the storage unit 71 by the main control unit 72 when the projector 1 is powered off.

The start control unit 763 corresponds to start control unit according to the invention, adjusts the length of the limited period on the basis of the operation state of the light source lamp 411, and controls the fan voltage value to be applied to the fan 61 to adjust the limited flow rate, which is the flow rate of a cooling fluid per unit time sent from the cooling device 6 within the limited period, thereby operating the cooling device 6.

Specifically, the start control unit 763 acquires the operation mode at the time of the start of turn-on acquired by the mode acquisition unit 761 and the start parameters according to the operation history acquired by the operation history acquisition unit 762 from the storage unit 71. At this time, when the operation mode is frequently switched, with regard to the start parameters acquired by the start control unit 763, the start parameters of the pattern A are acquired. When the operation mode is not frequently switched, the start parameters of the pattern B are acquired. Of the patterns A and B, the start parameters to be acquired may be set in advance.

Until the time limit set in the acquired start parameters elapses from the start of turn-on of the light source lamp 411, the start control unit 763 performs control such that the power supply device 3 applies the voltage of the fan voltage value set in the same manner to the fan 61. Thus, the flow rate of cooling air sent to the light source lamp 411 is suppressed to be smaller than the set flow rate according to the lamp electric power value, and the temperature of the light source lamp 411 increases to the temperature at which accumulated blackening can be eliminated.

The elapsed time determination unit 764 acquires the time measured by the timing unit 75 from the start of turn-on of the light source lamp 411, and determines whether or not the set time limit has elapsed.

The normal control unit 765 performs control such that, after the limited period has elapsed, the cooling device 6 (fan 61) sends cooling air at the set flow rate according to the lamp electric power value to the light source lamp 411.

Specifically, the normal control unit 765 acquires the driving parameters according to the operation mode acquired by the mode acquisition unit 761 from the storage unit 71. After the limited period has elapsed, the normal control unit 765 puts the cooling device 6 (fan 61) into operation on the basis of the acquired driving parameters. Thus, cooling air at a flow rate adjusted to the power value of lamp electric power being supplied is sent to the light source lamp 411, and the light source lamp 411 is cooled to an optimum temperature.

Cooling Control Process when Turn-on of Light Source Lamp Starts

Figure 4:
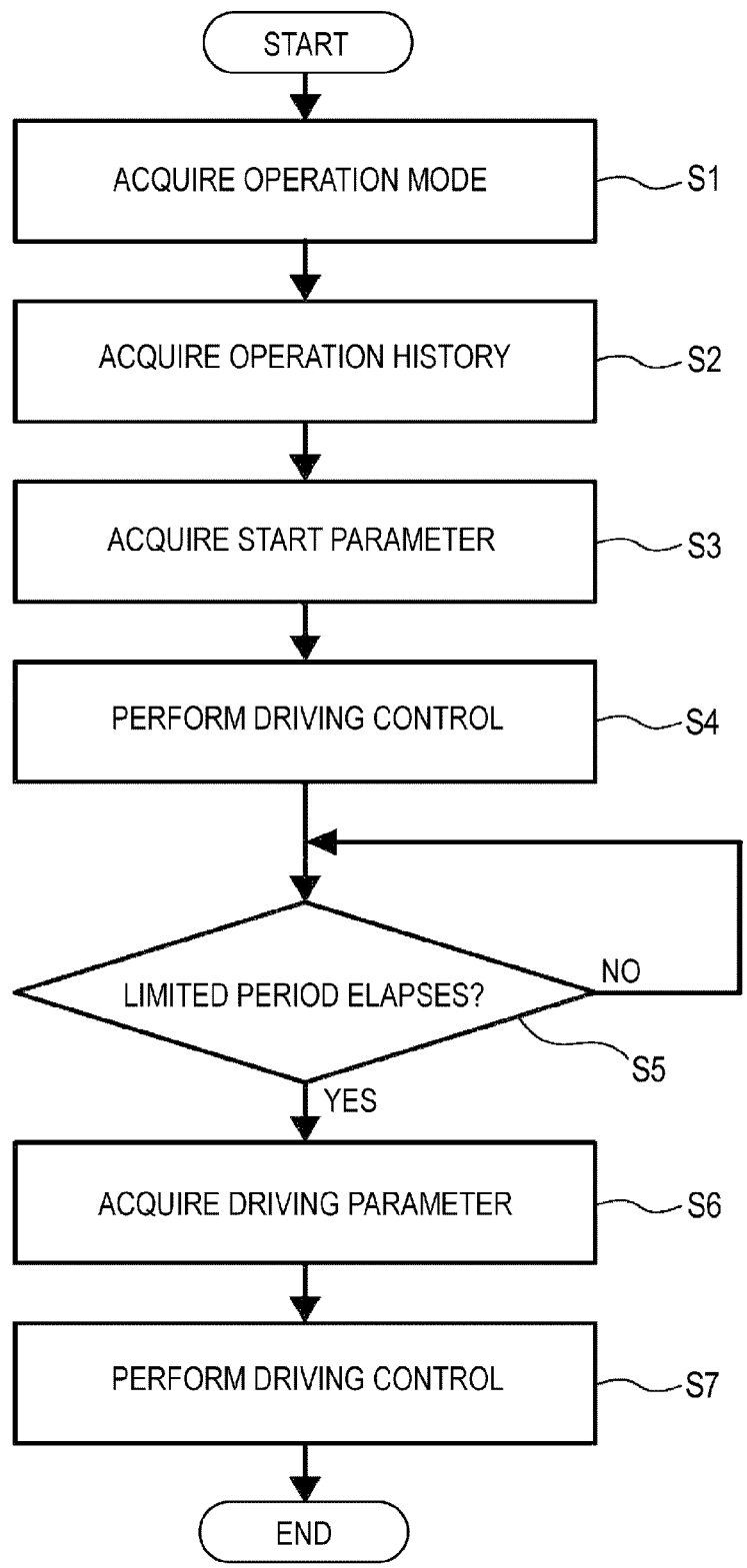
FIG. 4 is a flowchart showing a cooling control process in the above-described embodiment.

FIG. 4 is a flowchart showing a cooling control process which is performed by the control device 7 when the turn-on of the light source lamp 411 starts.

If the power key is input and power is on, the control device 7 performs control such that the light source lamp 411 is turned on by the lighting control unit 74 in the operation mode set by the user, and also performs the following cooling control process. This cooling control process is performed when the CPU constituting the control device 7 executes a program stored in the storage unit 71.

As shown in FIG. 4, in the cooling control process, first, the mode acquisition unit 761 acquires the operation mode of the light source lamp 411 on the basis of the control signal input from the main control unit 72 (Step S1).

Next, the operation history acquisition unit 762 acquires the power value at the time of previous turn-off which is the operation history stored in the storage unit 71 (Step S2).

The start control unit 763 acquires the start parameters according to the acquired power value at the time of previous turn-off with reference to the start parameter table according to the acquired operation mode from the start parameter tables (Step S3).

The start control unit 763 performs control such that the power supply device 3 supplies a voltage according to the fan voltage value included in the start parameters to the fan 61 until the time limit included in the acquired start parameters elapses from when lamp electric power starts to be supplied to the light source lamp 411 (Step S4).

The elapsed time determination unit 764 determines whether or not the measured time of the timing unit 75 which starts to be measured along with the start of the supply of lamp electric power to the light source lamp 411 has elapsed the time limit (Step S5).

When the elapsed time determination unit 764 determines that the measured time has not elapsed the time limit, the control device 7 repeatedly performs Step S5, and successively performs Step S4. Thus, the temperature of the light source lamp 411 increases to the temperature at which blackening is eliminated.

When the elapsed time determination unit 764 determines that the measured time has elapsed the time limit, the normal control unit 765 acquires the driving parameters according to the operation mode acquired in Step S1 from the storage unit 71 (Step S6).

The normal control unit 765 puts the cooling device 6 into operation in accordance with the acquired driving parameters (Step S7). Thus, the light source lamp 411 is cooled at a temperature adjusted to the set operation mode (lamp electric power value).

Figure 5:
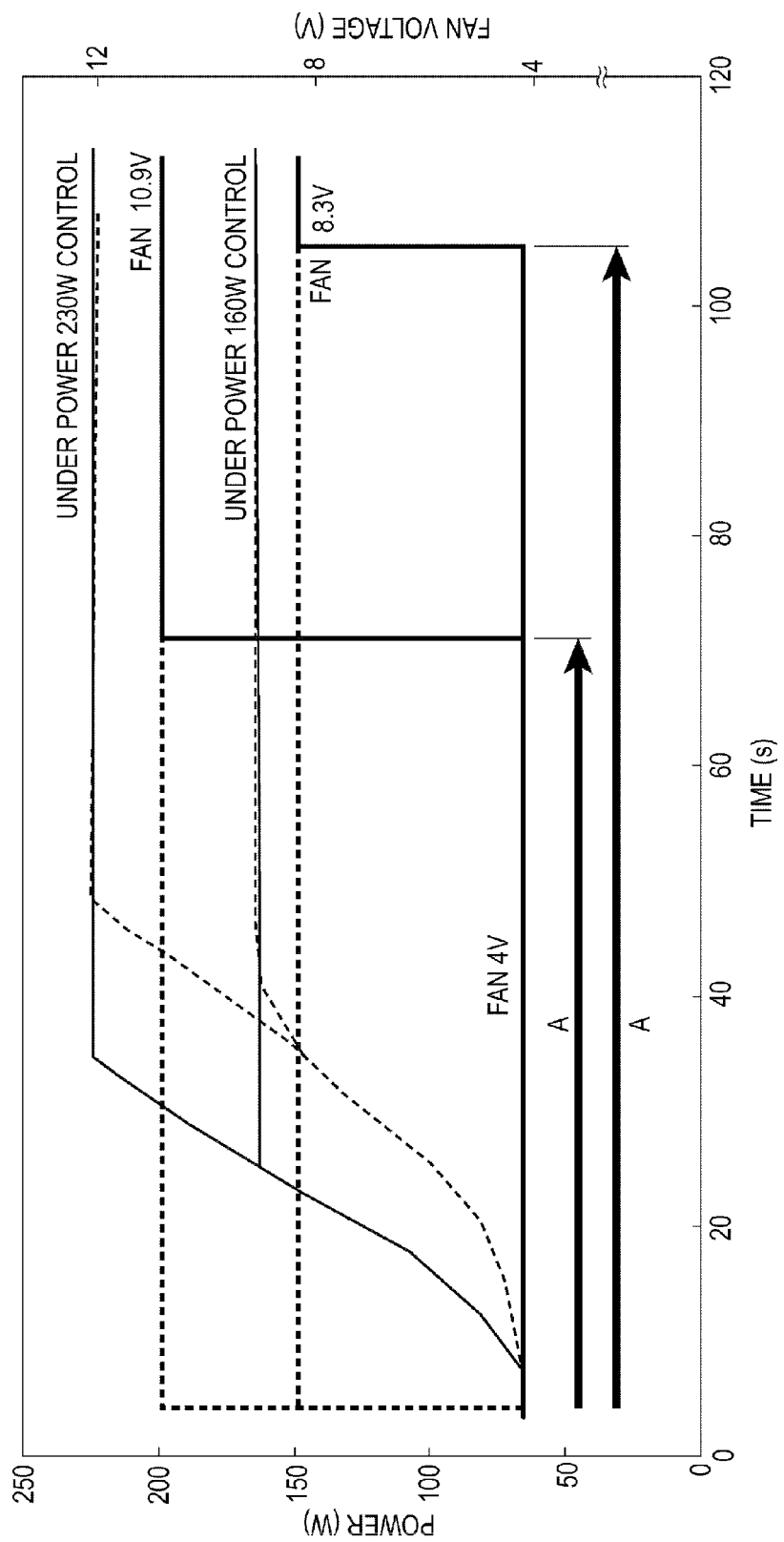
FIG. 5 is a diagram showing power transition when a cooling control process is performed in the above-described embodiment.

FIG. 5 is a diagram showing power transition when the cooling control process is performed and power transition when the cooling control process is not performed at the time of the start of turn-on of the light source lamp 411.

The power transition of the light source lamp 411 when the cooling control process is not performed is indicated by a fine dotted line in FIG. 5. In this case, as indicated by a bold dotted line in FIG. 5, the fan 61 is driven with the driving parameter (the fan voltage value of 8.3 V or 10.9 V) set in accordance with the operation mode from the start of turn-on of the light source lamp 411, and cooling air at a set flow rate according to the operation mode is sent to the light source lamp 411 by the cooling device 6.

The set flow rate is the flow rate of cooling air for maintaining the temperature of the light source lamp 411, which is stably turned on in the operation mode, to the optimum temperature. For this reason, if cooling air at the set flow rate is sent at the time of the start of turn-on of the light source lamp 411, an increase in temperature of the light source lamp 411 in a low-temperature state (for example, room temperature) is not rapidly done. For this reason, the time when target power is reached is extended, and the time when the desired brightness is reached is extended. If cooling air at the set flow rate is sent to the light source lamp 411, it is hard to allow the temperature of the light source lamp 411 to increases to the temperature at which blackening can be eliminated. For this reason, blackening accumulated by the turn-on of the light source lamp 411 in the low power mode is hardly eliminated.

The power transition of the light source lamp 411 when the cooling control process is performed is indicated by a fine solid line in FIG. 5. In this case, as indicated by a bold sold line in FIG. 5, the fan 61 is operated by the start parameter (in the example of FIG. 5, a fan voltage value of 4 V) acquired on the basis of the operation history of the light source lamp 411 until a limited period A elapses from the start of turn-on of the light source lamp 411. For this reason, cooling air at a flow rate smaller than the set flow rate according to the operation mode is set to the light source lamp 411 by the cooling device 6.

For this reason, in the limited period A, the temperature of the light source lamp 411 rapidly increases, and the time when target power is reached is shortened compared to the above-described case, such that the time when the desired brightness is reached is shortened. The limited period A is set to be longer than the period until target power is reached from insulation breakdown of light source lamp 411, such that the temperature of the light source lamp 411 easily reaches the temperature at which blackening can be eliminated. Thus, blackening accumulated in the light source lamp 411 is eliminated.

According to the projector 1 of this embodiment described above, the following effects are obtained.

The start control unit 763 adjusts the length of the limited period and the fan voltage value corresponding to the limited flow rate on the basis of the operation state of the light source lamp 411. Thus, when the light source lamp 411 is turned on under the condition that blackening is likely to be generated and accumulated or when the light source lamp 411 will be turned on under the above-described condition, it is possible to allow the temperature of the light source lamp 411 to increase to the temperature at which blackening is eliminated. Therefore, it is possible to perform a process for eliminating blackening at each time of turn-on of the light source lamp 411, thereby suppressing the accumulation of blackening.

After the limited period has elapsed, the normal control unit 765 performs control such that the cooling device 6 sends cooling air at the set flow rate according to lamp electric power to the light source lamp 411. Thus, it is possible to suppress an increase in temperature of the light source lamp 411. Therefore, it is possible to allow the light source lamp 411 to be stably turned on and to suppress the occurrence of devitrification or blowing in the light source lamp 411.

The start control unit 763 adjusts at least one of the length of the limited period and the limited flow rate on the basis of the operation history of the light source lamp 411. Specifically, the start control unit 763 adjusts the length of the limited period and the fan voltage value on the basis of the power value of lamp electric power before turn-off. Thus, when the power value of lamp electric power at the time of turn-off is low, and the accumulation of blackening is expected, at the time of next turn-on of the light source lamp 411, it is possible to allow the temperature of the light source lamp 411 to reliably increase to the temperature at which blackening is eliminated. Therefore, it is possible to shorten the time when the desired brightness is reached and to more reliably suppress the accumulation of blackening.

The start control unit 763 acquires the start parameters, in which the length of the limited period and the driving information are set, from the storage unit 71 on the basis of the operation state of the light source lamp 411. Thus, in order to put the fan 61 into operation, the process for calculating the length of the limited period and the limited flow rate can be omitted by an arithmetic operation. Therefore, it is possible to simplify the process of the start control unit 763, and to appropriately put the cooling device 6 into operation.

The storage unit 71 stores the voltage value of the fan voltage as the driving information. Thus, the start control unit 763 can control the operation of the fan 61 using the voltage value acquired from the storage unit 71. Therefore, it is possible to further simplify the process of the start control unit 763.

Second Embodiment

Hereinafter, a second embodiment of the invention will be described.

A projector of this embodiment has the same configuration as the above-described projector 1. In the projector 1, the power value at the time of previous turn-off is held as the operation history of the light source lamp 411. In contrast, in the projector of this embodiment, the ratio (average-rated power ratio) of an average power value in a predetermined period before previous turn-off and a rated power value is held as the operation history, and the start parameters are acquired on the basis of the ratio. From this point, the projector of this embodiment is different from the projector 1. In the following description, the same or substantially same parts as the parts described above are represented by the same reference numerals, and description thereof will not be repeated.

The projector of this embodiment includes the same configuration and function as the projector 1, except that the operation of the main control unit 72, the stored content of the storage unit 71, and the content of the cooling control process are partially different.

Specifically, the main control unit 72 calculates the average-rated power ratio as the operation history of the light source lamp 411, and stores the average-rated power ratio in the storage unit 71 when the projector is powered off. The average-rated power ratio is the percentage of the average lamp electric power value with respect to the rated power value (in this embodiment, 230 W) of the light source lamp 411. In this embodiment, the average lamp electric power value in a predetermined period before turn-off is used as the average lamp electric power value, thereby achieving reduction in the capacity of the storage unit 71. However, if there is a sufficient margin in the capacity, an average lamp electric power value from the start of turn-on of the light source lamp 411 until turn-off may be used.

Instead of the above-described start parameter table, the storage unit 71 stores a start parameter table, in which the average-rated power ratio at the time of previous turn-on serving as the operation history of the light source lamp 411 is set in association with the driving information (fan voltage value) and the limited period, for each operation mode at the time of the start of turn-on of the light source lamp 411.

FIG. 6 is a diagram showing an example of a start parameter table stored in the storage unit 71 of the projector of this embodiment. FIG. 6 shows a start parameter table which is applied when the turn-on of the light source lamp 411 starts in the high power mode.

For example, as shown in FIG. 6, in a start parameter table which is applied when the operation mode at the time of the start of turn-on is the high power mode, the start parameters of the patterns A and B described above are set for each average-rated power ratio.

Of these, in the start parameters of the pattern A, a constant fan voltage value is set, and a different limited period is set for each average-rated power ratio. In the pattern A, the higher the average-rated power ratio, the shorter the limited period is set.

In the start parameters of the pattern B, a constant limited period is set, and a different fan voltage value is set for each average-rated power ratio. In the pattern B, the higher the average-rated power ratio, the higher the fan voltage value is set.

As described above, the limited period is set to be longer than the period when the light source lamp 411 reaches the turn-on state with target power from insulation breakdown, and each fan voltage value is set to be equal to or smaller than the fan voltage value for sending cooling air at the set flow rate according to the lamp electric power value.

In the projector of this embodiment, when the light source lamp 411 starts to be turned on, the control device 7 reads a program stored in the storage unit 71, and performs the same cooling control process as the above-described cooling control process.

In Step S1 of the cooling control process, the mode acquisition unit 761 acquires the operation mode at the time of the start of turn-on of the light source lamp 411 on the basis of an input control signal.

In Step S2, the operation history acquisition unit 762 acquires the average-rated power ratio stored in the storage unit 71 at the time of previous turn-off of the light source lamp 411.

In Step S3, the start control unit 763 acquires the start parameters according to the operation mode and the average-rated power ratio acquired in Steps S1 and S2.

Thereafter, in Step S4, the start control unit 763 controls the operation of the cooling device 6 (fan 61) on the basis of the limited period and the fan voltage value of the acquired start parameters.

Steps S5 to S7 are the same as the above-described processing contents.

According to the projector of this embodiment described above, in addition to the same effects as the above-described projector 1, the following effects are obtained.

When the average-rated power ratio before turn-off is high, this indicates that lamp electric power close to rated power is supplied to the light source lamp. In this case, it can be determined that the average temperature of the light source lamp is high, and blackening is generated with difficulty. Meanwhile, when the average-rated power ratio is low, this indicates that lamp electric power lower than rated power is supplied. In this case, it can be determined that the average temperature of the light source lamp is low, and blackening is likely to be generated.

For this reason, the start control unit 763 adjusts the length of the limited period and the limited flow rate on the basis of the average-rated power ratio before turn-off, such that the fan voltage having a voltage value according to the limited flow rate is supplied to the fan 61 until the limited period elapses from the start of turn-on of the light source lamp 411. Thus, when the light source lamp 411 is turned on under the condition that blackening is likely to be generated, at the time of the next start, it is possible to allow the temperature of the light source lamp 411 to reliably increase to the temperature at which blackening is eliminated. Therefore, it is possible to more reliably suppress the accumulation of blackening.

Third Embodiment

Next, a third embodiment of the invention will be described.

A projector of this embodiment has the same configuration as the above-described projector 1. In the projector 1, the lamp electric power value at the time of previous turn-off is stored as the operation history of the light source lamp 411. In contrast, in the projector of this embodiment, the lamp voltage and the operation mode of the light source lamp 411 before turn-off are stored as the operation history. From this point, the projector of this embodiment is different from the projector 1. In the following description, the same or substantially same parts as the parts described above are represented by the same reference numerals, and description thereof will not be repeated.

The projector of this embodiment includes the same configuration as the projector 1, except that the operation of the main control unit 72, the stored content of the storage unit 71, and the operation of the cooling control unit 76 in the cooling control process are partially different.

Of these, when the projector is powered off, the main control unit 72 stores the lamp voltage value detected by the detection device 5 and the operation mode of the light source lamp 411 in the storage unit 71 as the operation history of the light source lamp 411. Although in this embodiment, the lamp voltage value at the time of turn-off is stored, the invention is not limited thereto. An average lamp voltage value of a predetermined period when the projector is powered off may be stored.

The storage unit 71 stores start parameter tables which are different from the above-described start parameter tables. The start parameter tables are provided for each operation mode at the time of the start of turn-on of the light source lamp 411, and divided for each operation mode at the time of previous turn-off of the light source lamp 411. In each start parameter table, the lamp voltage value at the time of previous turn-off as the operation history of the light source lamp 411 is set in association with the driving information (fan voltage value) and the limited period.

FIG. 7 is a diagram showing an example of a start parameter table stored in the storage unit 71. FIG. 7 shows a start parameter table which is applied when the operation mode of the light source lamp 411 at the time of previous turn-off and the operation mode of the light source lamp 411 at the time of the start of turn-on are the high power mode.

For example, in the start parameter table which is applied when the operation modes of the light source lamp 411 at the time of previous turn-off and at the time of the start of turn-on are the high power mode, as shown in FIG. 7, the start parameters of the patterns A and B are set for each lamp voltage value.

Of these, in the start parameters of the pattern A, a constant fan voltage value is set, and a different limited period for each lamp voltage value at the time of the start of turn-on is set. In the pattern A, the higher the lamp voltage value, the shorter the limited period is set.

In the start parameters of the pattern B, a constant limited period is set, and a different fan voltage value for each lamp voltage value at the time of the start of turn-on is set. In the pattern B, the higher the lamp voltage value, the higher the fan voltage value is set.

As described above, the limited period is set to be longer than the period when the light source lamp 411 reaches the turn-on state with target power after insulation breakdown, and each fan voltage value is set to be equal to or smaller than the fan voltage value for sending cooling air at the set flow rate according to the lamp electric power value.

A change in the lamp voltage when lamp electric power having a certain power value is supplied can become the index of the arc length which is formed between the electrodes of the light source lamp 411. Specifically, when the lamp voltage value is high, this indicates that the arc length is long. In this case, blackening is generated with difficulty. Meanwhile, when the lamp voltage value is low, this indicates that the arc length is short. In this case, blackening is likely to be generated.

As described above, when the lamp voltage value is low, it is determined that blackening is accumulated. For this reason, a long limited period or a low fan voltage value is set in the start parameters, such that cooling air at a flow rate smaller than the set flow rate according to the lamp electric power value is sent to the light source lamp 411. Thus, cooling of the light source lamp 411 is temporarily limited, and an increase in temperature of the light source lamp 411 is rapidly done. Therefore, it is possible to shorten the time when the desired brightness is reached, and to allow the temperature of the light source lamp 411 to increase to the temperature at which blackening accumulated in the discharge space can be eliminated.

In the projector of this embodiment, when the light source lamp 411 starts to be turned on, the control device 7 reads a program stored in the storage unit 71, and performs the same cooling control process as the above-described cooling control process.

In Step S1 of the cooling control process, the mode acquisition unit 761 acquires the operation mode at the time of the start of turn-on of the light source lamp 411 on the basis of the input control signal.

In Step S2, the operation history acquisition unit 762 acquires the operation mode and the lamp voltage value at the time of previous turn-off of the light source lamp 411.

In Step S3, the start control unit 763 acquires the start parameters according to the operation mode and the lamp voltage value acquired in Steps S1 and S2 with reference to the start parameter table.

Thereafter, in Step S4, the start control unit 763 controls the operation of the cooling device 6 (fan 61) on the basis of the limited period and the fan voltage value of the acquired start parameters.

Steps S5 to S7 are the same as the above-described processing contents.

According to the projector of this embodiment described above, in addition to the same effects as the above-described projector 1, the following effects are obtained.

The start control unit 763 adjusts the length of the limited period and the limited flow rate on the basis of the voltage value of lamp electric power before turn-off, such that the fan voltage having a voltage value according to the limited flow rate is supplied to the fan 61 until the limited period elapses from the turn-on of the light source lamp 411. Thus, when light source lamp 411 is turned on in a state where blackening is likely to be generated, at the time of the start of next turn-on, it is possible to allow the temperature of the light source lamp 411 to reliably increase to the temperature at which blackening is eliminated. Therefore, it is possible to more reliably suppress the accumulation of blackening.

Fourth Embodiment

Next, a fourth embodiment of the invention will be described.

A projector of this embodiment has the same configuration as the above-described projector. In the above-described projector, the lamp electric power value, the average-rated power ratio, and the lamp voltage value before the light source lamp 411 is turned off are stored as the operation history of the light source lamp 411, and the limited period and the driving information (fan voltage value) are adjusted on the basis of the lamp electric power value, the average-rated power ratio, and the lamp voltage value. In contrast, in the projector of this embodiment, at the time of the start of turn-on of the light source lamp 411, a lamp current value and a lamp voltage value are monitored to measure a glow discharge period, and the limited period and the driving information are adjusted in accordance with the length of the glow discharge period. From this point, the projector of this embodiment is different from the above-described projector. In the following description, the same or substantially same parts as the parts described above are represented by the same reference numerals, and description thereof will not be repeated.

Figure 8:
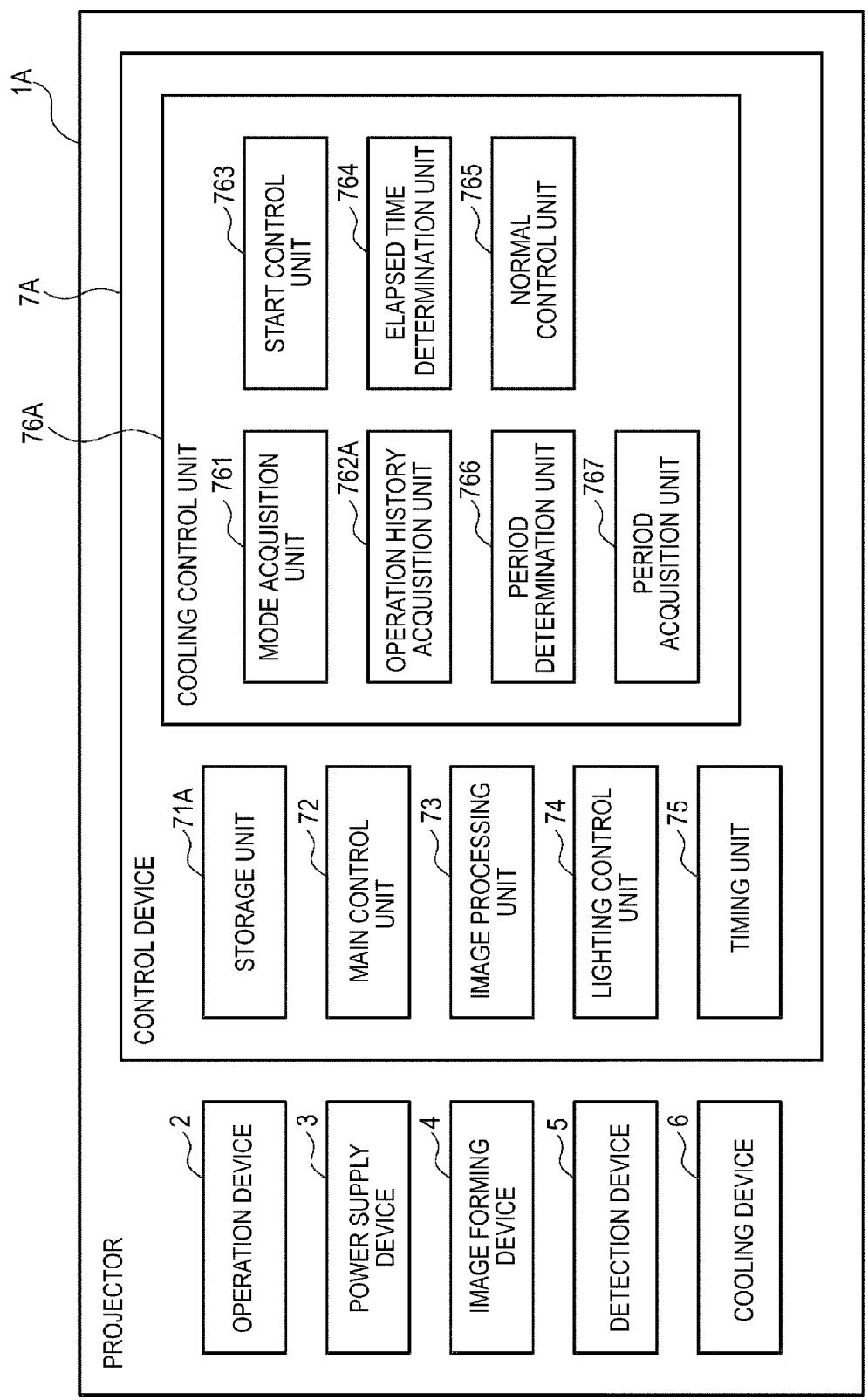
FIG. 8 is a block diagram showing the configuration of a projector according to a fourth embodiment of the invention.

FIG. 8 is a block diagram showing the configuration of a projector 1A of this embodiment.

As shown in FIG. 8, the projector 1A of this embodiment has the same configuration and function as the projector 1, except that a control device 7A, instead of the control device 7, is provided.

The control device 7A has the same configuration as the control device 7, except that, a storage unit 71A and a cooling control unit 76A, instead of the storage unit 71 and the cooling control unit 76, are provided. The cooling control unit 76A has the same configuration as the cooling control unit 76, except that, instead of the operation history acquisition unit 762, an operation history acquisition unit 762A, a period determination unit 766, and a period acquisition unit 767 are provided.

The operation history acquisition unit 762A acquires the lamp current value and the lamp voltage value detected by the detection device 5.

The period determination unit 766 determines whether or not a transition to an arc discharge period is made through a glow discharge period after insulation breakdown has occurred through the application of an igniter pulse by the power supply device 3 at the time of the start of turn-on of the light source lamp 411. Specifically, the period determination unit 766 monitors the acquired lamp current value, and determines whether or not the glow discharge period ends (transition to the arc discharge period is made) on the basis of whether or not the lamp current value reaches a predetermined limited current value (for example, 3.3 A).

When the period determination unit 766 determines that the glow discharge period ends, the period acquisition unit 767 acquires the elapsed time from the start of turn-on of the light source lamp 411 measured by the timing unit 75 as the length of the glow discharge period.

The start control unit 763 acquires the start parameters according to the operation mode at the time of the start of turn-on of the light source lamp 411 and the length of the acquired glow discharge period from the storage unit 71A. The start control unit 763 puts the cooling device 6 (fan 61) into operation on the basis of the driving information included in the start parameters until the limited period included in the start parameters elapses from the start of turn-on of the light source lamp 411. In this embodiment, the start control unit 763 puts the fan 61 into operation with a predetermined voltage value (for example, a minimum voltage value) for putting the fan 61 into operation until the start parameters are acquired.

The storage unit 71A stores the same contents as the stored content of the storage unit 71, except that a start parameter table different from the above-described start parameter table is stored.

That is, the storage unit 71A stores a start parameter table, in which the length of the glow discharge period is set in association with the limited period and the driving information (fan voltage value), for each operation mode at the time of the start of turn-on of the light source lamp 411.

FIG. 9 is a diagram showing an example of a start parameter table stored in the storage unit 71A. FIG. 9 shows a start parameter table which is applied when the operation mode at the time of the start of turn-on of the light source lamp 411 is the high power mode.

For example, in the start parameter table which is applied when the light source lamp 411 is turned on in the high power mode at the time of the start of turn-on, as shown in FIG. 9, the start parameters of the patterns A and B described above are set for each length of the glow discharge period.

Of these, in the start parameters of the pattern A, a constant fan voltage value is set, and a different limited period is set for each length of the glow discharge period. In the pattern A, the longer the glow discharge period, the longer the limited period is set.

In the start parameters of the pattern B, a constant limited period is set, and a different fan voltage value is set for each length of the glow discharge period. In the pattern B, the longer the glow discharge period, the lower the fan voltage value is set.

If the glow discharge period included in the start period after insulation breakdown of the light source lamp 411 is long, the period in which the electrodes receive a sputter by ions is extended, and the amount of blackening to be generated is likely to increase. For this reason, as described above, when the glow discharge period is long, a long limited period or a low fan voltage value is set, such that cooling of the light source lamp 411 by the cooling device 6 is temporarily limited, and the temperature of the light source lamp 411 rapidly increases to such an extent that blackening is eliminated.

Figure 10:
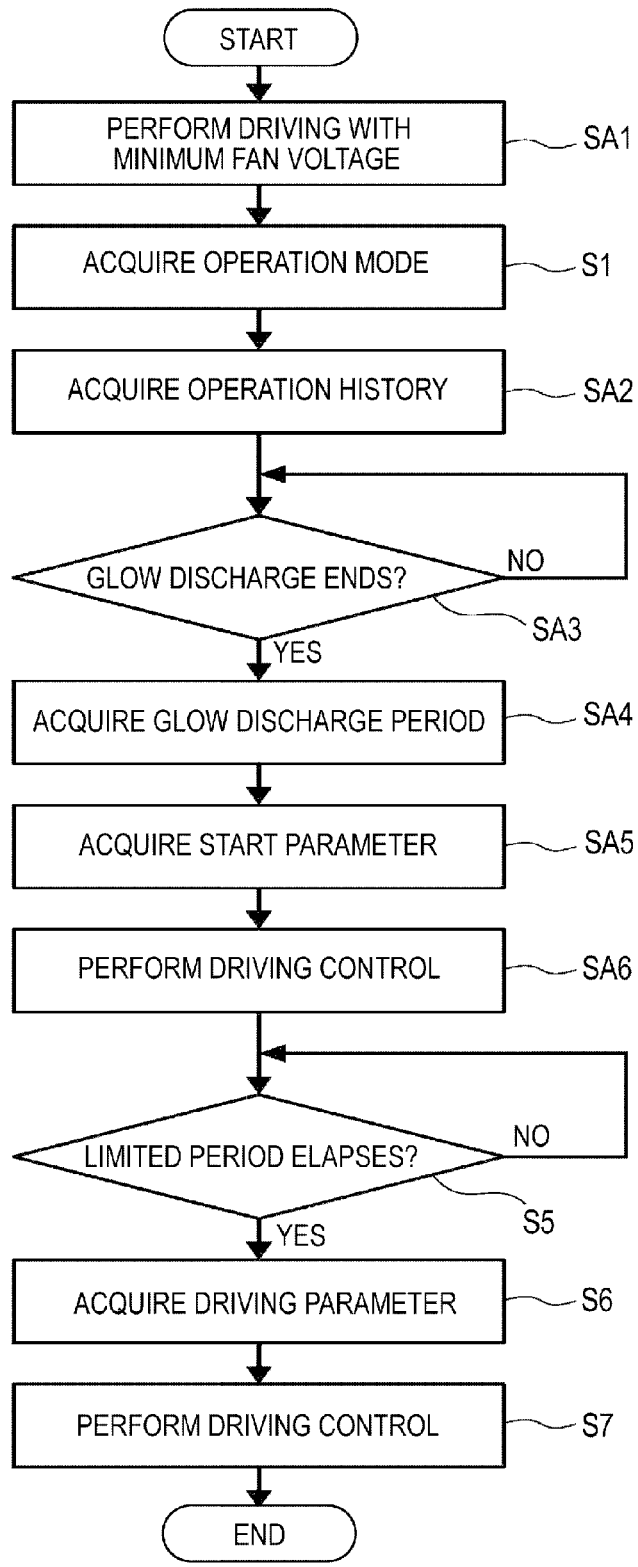
FIG. 10 is a flowchart showing a cooling control process in the above-described embodiment.

FIG. 10 is a flowchart showing a cooling control process which is performed by the control device 7A at the time of the start of turn-on of the light source lamp 411.

In this projector 1A, when the light source lamp 411 starts to be turned on, the control device 7A reads a program stored in the storage unit 71A and performs the following cooling control process.

In this cooling control process, as shown in FIG. 10, first, the start control unit 763 drives the fan 61 with a predetermined voltage (Step SA1).

The mode acquisition unit 761 acquires the operation mode at the time of the start of turn-on of the light source lamp 411 (Step S1). The operation history acquisition unit 762A acquires the lamp current value detected by the detection device 5 as the operation history of the light source lamp 411 (Step SA2).

Next, the period determination unit 766 monitors the acquired lamp current value, and determines whether or not the lamp current value exceeds a predetermined limited current value to determine whether or not the glow discharge period ends (Step SA3).

If it is determined that the glow discharge period does not end, the control device 7A repeats the determination process in Step SA3.

If it is determined that the glow discharge period ends, the period acquisition unit 767 acquires the elapsed time from the timing unit 75 for measuring the elapsed time from the start of turn-on of the light source lamp 411 (the start of supply of lamp electric power) as the glow discharge period (Step SA4).

Next, the start control unit 763 acquires the start parameter (limited period and driving information) corresponding to the acquired operation mode and glow discharge period from the storage unit 71A (Step SA5), and controls the driving of the cooling device 6 on the basis of the acquired driving information until the limited period elapses (Step SA6).

Thereafter, the same process as Steps S5 to S7 is performed.

According to the projector 1A of this embodiment described above, in addition to the same effects of the above-described projector 1, the following effects are obtained.

The start control unit 763 adjusts the length of the limited period and the limited flow rate on the basis of the glow discharge period, such that the fan voltage having a voltage value according to the limited flow rate is supplied to the fan 61 until the limited period elapses from the turn-on of the light source lamp 411. Thus, at the time of the start of turn-on of the light source lamp 411, it is possible to allow the temperature of the light source lamp 411 to reliably increase to the temperature at which accumulated blackening is eliminated. Therefore, it is possible to more reliably suppress the accumulation of blackening.

Fifth Embodiment

Next, a fifth embodiment of the invention will be described.

A projector of this embodiment performs the cooling control process (see FIG. 4) described in the first to third embodiments if the cumulative turn-on time of the light source lamp 411 is smaller than a predetermined time, and performs the cooling control process (see FIG. 10) described in the fourth embodiment if the cumulative turn-on time is equal to or greater than the predetermined time. From this point, the projector of this embodiment is different from the projector 1 or 1A. In the following description, the same or substantially same parts as the parts described above are represented by the same reference numerals, and description thereof will not be repeated.

Figure 11:
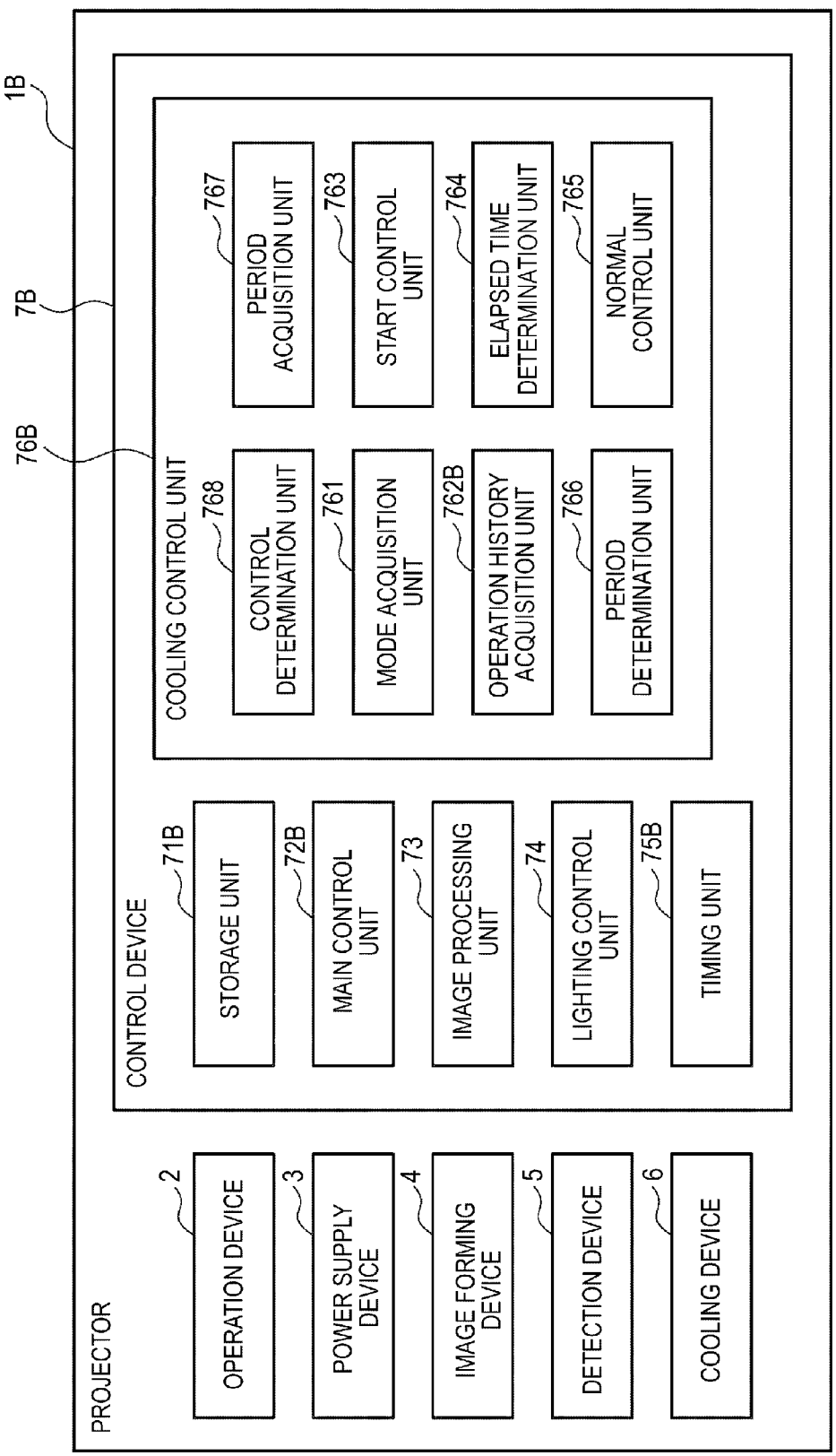
FIG. 11 is a block diagram showing the configuration of a projector according to a fifth embodiment of the invention.

FIG. 11 is a block diagram showing the configuration of a projector 1B of this embodiment.

As shown in FIG. 11, the projector 1B of this embodiment has the same configuration and function as the projector 1, except that a control device 7B, instead of the above-described control device 7, is provided. The control device 7B has the same configuration and function as the control device 7, except that, instead of the storage unit 71, the main control unit 72, the timing unit 75, and the cooling control unit 76, storage unit 71B, main control unit 72B, timing unit 75B, and cooling control unit 76B are provided.

The storage unit 71B stores the same content as the content stored in each of the above-described storage units 71 and 71A. For example, the storage unit 71B stores the driving parameter table and the start parameter table stored in the storage unit 71 described in the above-described first to third embodiments, and also stores the start parameter table stored in the storage unit 71A described in the above-described fourth embodiment. The storage unit 71B also stores information representing the operation history of the above-described light source lamp 411.

The main control unit 72B performs the process which is performed by the main control unit 72, and also allows the timing unit 75B to measure the cumulative turn-on time of the light source lamp 411 in accordance with the turn-on and turn-off of the light source lamp 411.

The timing unit 75B performs the process which is performed by the timing unit 75, and also measures the cumulative turn-on time of the light source lamp 411 under the control of the main control unit 72B.

The cooling control unit 76B performs control such that the cooling device 6 sends cooling air for cooling the constituent parts (in particular, the light source lamp 411) of the projector 1. The cooling control unit 76B provides the above-described limited period at the time of the start of turn-on of the light source lamp 411, such that the temperature of the light source lamp 411 rapidly increases, the time when the desired brightness is reached is shortened, and blackening generated in the discharge space S is eliminated. At this time, the cooling control unit 76B switches and performs the cooling control process described in one of the above-described first to third embodiments and the cooling control process described in the above-described fourth embodiment under a predetermined condition. In this embodiment, the predetermined condition refers to whether or not the cumulative turn-on time of the light source lamp 411 is equal to or greater than a predetermined time. If the cumulative turn-on time is smaller than the predetermined time, the cooling control process described in one of the first to third embodiments is performed. If the cumulative turn-on time is equal to or greater than the predetermined time, the cooling control process described in the fourth embodiment is performed.

Although in this embodiment, a case has been described where the cooling control unit 76B performs the cooling control process described in the third embodiment, the cooling control process described in the first or second embodiment may be performed.

The cooling control unit 76B has a condition determination unit 768, a mode acquisition unit 761, an operation history acquisition unit 762B, a period determination unit 766, a period acquisition unit 767, a start control unit 763, an elapsed time determination unit 764, and a normal control unit 765.

The condition determination unit 768 determines the above-described condition at the time of the start of turn-on of the light source lamp 411, and outputs a control signal representing the determination result to each functional unit constituting the cooling control unit 76B. In this embodiment, the condition determination unit 768 determines whether or not the cumulative turn-on time of the light source lamp 411 measured by the timing unit 75B is equal to or greater than a predetermined time (for example, 2000 hours).

The operation history acquisition unit 762B changes the operation history of the light source lamp 411 to be acquired on the basis of the determination result of the condition determination unit 768. For example, when it is determined that the cumulative turn-on time is smaller than the predetermined time, the operation history acquisition unit 762B acquires the operation history (the lamp voltage value and the operation mode at the time of previous turn-off) of the light source lamp 411 stored in the storage unit 71B. When it is determined that the cumulative turn-on time is equal to or greater than the predetermined time, the operation history acquisition unit 762B acquires the lamp current value and the lamp voltage value detected by the detection device 5.

When it is determined that the cumulative turn-on time is equal to or greater than the predetermined time, the period determination unit 766 and the period acquisition unit 767 function as described above.

When it is determined that the cumulative turn-on time is smaller than the predetermined time, the start control unit 763 acquires the start parameters based on information (the lamp voltage value and the operation mode at the time of previous turn-off) acquired by the operation history acquisition unit 762B with reference to the start parameter table of the storage unit 71B.

When it is determined that the cumulative turn-on time is equal to or greater than the predetermined time, the start control unit 763 acquires the start parameters according to the length of the glow discharge period acquired by the period acquisition unit 767 with reference to the start parameter table of the storage unit 71B.

The start control unit 763 performs control such that a voltage according to the fan voltage value included in the start parameters is supplied to the fan 61 until the elapsed time determination unit 764 determines that the limited period included in the acquired start parameter has elapsed.

Thereafter, if the elapsed time determination unit 764 determines that the limited period has elapsed, operation control of the fan 61 is performed on the basis of the driving parameters by the normal control unit 765.

When the light source lamp 411 starts to be turned on, the cooling control process which is performed when the control device 7B reads and executes a program stored in the storage unit 71B includes the cooling control process described in the third embodiment and the cooling control process described in the fourth embodiment. As described above, any cooling control process is performed on the basis of the determination result by the condition determination unit 768, thus description thereof will not be repeated.

The reason for which the cooling control process is switched is as follows.

In the case of normal turn-on, if the arc length between the electrodes E is shortened, the current value of lamp electric power increases, and blackening is likely to be generated. Meanwhile, in the glow discharge period, when the arc length is short, a transition to the arc discharge is easily made, such that the glow discharge period is reduced, and the generation of blackening by a sputter or the like is suppressed. The importance of the factor for which blackening is likely to be generated changes depending on the state of the light source lamp.

In the comparatively first half period in the lifetime of the light source lamp 411, an influence of the arc length on blackening being likely to be generated increases compared to the length of the glow discharge period. In the comparatively second half period, the relationship is reversed.

Thus, the cooling control process according to the former and the cooling control process according to the latter are appropriately switched with the cumulative turn-on time of the light source lamp 411 as index, thereby effectively suppressing the accumulation of blackening in the light source lamp 411.

According to the projector 1B of this embodiment described above, in addition to the same effects as the above-described projector 1 or 1A, the following effects are obtained.

When the cumulative turn-on time of the light source lamp 411 is smaller than the predetermined time, the start parameters are acquired in accordance with lamp electric power (the lamp voltage value and the operation mode at the time of previous turn-off). When the cumulative turn-on time is equal to or greater than the predetermined time, the start parameters according to the length of the glow discharge period are acquired. The start control unit 763 controls the driving of the fan 61 on the basis of the start parameters, thereby performing effective cooling control according to the state of the light source lamp 411. Therefore, it is possible to more reliably suppress the accumulation of blackening.

As described above, the cooling control process which is performed when it is determined that the cumulative turn-on time is smaller than the predetermined time may be substituted with the cooling control process described in the first or second embodiment.

Sixth Embodiment

Next, a sixth embodiment of the invention will be described.

A projector of this embodiment has the same configuration as the above-described projector 1B. In the projector 1B, the cooling control process to be performed is switched on the basis of the cumulative turn-on time of the light source lamp 411. In contrast, in the projector of this embodiment, if the voltage value of lamp electric power at the time of normal turn-on is smaller than a predetermined value, the cooling control process described in one of the above-described first to third embodiments is performed. If the voltage value is equal to or greater than the predetermined value, the cooling control process described in the above-described fourth embodiment is performed. From this point, the projector of this embodiment is different from the projector 1B. In the following description, the same or substantially same parts as the parts described above are represented by the same reference numerals, and description thereof will not be repeated.

The projector of this embodiment has the same configuration and function as the above-described projector 1B.

When the projector is powered off, the main control unit 72B stores the lamp voltage value detected by the detection device 5 and the operation mode of the light source lamp 411 in the storage unit 71B as the operation history of the light source lamp 411. As in the above-described third embodiment, the average lamp voltage value in the predetermined period when the projector is powered off may be stored.

In this embodiment, the condition determination unit 768 acquires the lamp voltage value at the time of previous turn-off stored in the storage unit 71B at the time of the start of turn-on of the light source lamp 411, and determines whether or not the lamp voltage value is equal to or greater than a predetermined value (for example, 100 V). The condition determination unit 768 outputs a control signal representing the determination result to each functional unit constituting the cooling control unit 76B.

If the condition determination unit 768 determines that the lamp voltage value is smaller than the predetermined value, the operation history acquisition unit 762B acquires the operation history (the lamp voltage value and the operation mode) of the light source lamp 411 stored in the storage unit 71B. If it is determined that the lamp voltage value is equal to or greater than the predetermined value, the operation history acquisition unit 762B acquires the lamp current value and the lamp voltage value detected by the detection device 5.

When it is determined that the lamp voltage value is equal to or greater than the predetermined value, the period determination unit 766 and the period acquisition unit 767 function as described above.

When it is determined that the lamp voltage value is smaller than the predetermined value, the start control unit 763 acquires the start parameters based on information acquired by the operation history acquisition unit 762B. When it is determined that the lamp voltage value is equal to or greater than the predetermined value, the start control unit 763 acquires the start parameters according to the length of the glow discharge period acquired by the period acquisition unit 767.

The start control unit 763 performs control such that a voltage according to the fan voltage value included in the start parameters is applied to the fan 61 until the elapsed time determination unit 764 determines that the limited period included in the acquired start parameters has elapsed.

Thereafter, if the elapsed time determination unit 764 determines that the limited period has elapsed, operation control of the fan 61 is performed on the basis of the driving parameters by the normal control unit 765.

As in the above-described projector 1B, the cooling control process which is performed when the light source lamp 411 starts to be turned on includes the cooling control process described in the third embodiment and the cooling control process described in the fourth embodiment. Any cooling control process is performed on the basis of the determination result of the condition determination unit 768.

According to the projector of this embodiment described above, the same effects as the above-described projector 1B can be obtained.

That is, if the voltage value of lamp electric power at the time of normal turn-on (the voltage value of lamp electric power at the time of previous turn-off) is smaller than the predetermined value, the start parameters according to the voltage value of lamp electric power and the operation mode are acquired. If the voltage value is equal to or greater than the predetermined value, the start parameters according to the length of the glow discharge period are acquired. The start control unit 763 controls the driving of the fan 61 on the basis of the start parameters, thereby performing effective cooling control according to the state of the light source lamp 411. Therefore, it is possible to more reliably suppress the accumulation of blackening.

As in the above-described fifth embodiment, the cooling control process which is performed when it is determined that the lamp voltage value before previous turn-off is smaller than the predetermined value may be substituted with the cooling control process described in the first or second embodiment.

Seventh Embodiment

Next, a seventh embodiment of the invention will be described.

A projector of this embodiment has the same configuration as the above-described projector 1B, but the cooling control process to be performed is switched in accordance with whether or not the turn-on time of the light source lamp 411 at the time of previous turn-on is within a predetermined time. In the following description, the same or substantially same parts as the parts described above are represented by the same reference numerals, and description thereof will not be repeated.

The projector of this embodiment has the same configuration and function as the above-described projector 1B.

The main control unit 72B performs control such that the timing unit 75B measures the time (previous turn-on time) when the light source lamp 411 is turned on and then turned off. When the projector is powered off, the main control unit 72B stores the previous turn-on time in the storage unit 71B.

In this embodiment, the condition determination unit 768 acquires the previous turn-on time stored in the storage unit 71B at the time of the start of turn-on of the light source lamp 411, and determines whether or not the previous turn-on time is equal to or greater than a predetermined time. The condition determination unit 768 outputs a control signal representing the determination result to each functional unit constituting the cooling control unit 76B.

If it is determined that the previous turn-on time is equal to or greater than the predetermined time, the operation history acquisition unit 762B acquires the operation history (the lamp voltage value and the operation mode) of the light source lamp 411 stored in the storage unit 71B. If it is determined that the previous turn-on time is smaller than the predetermined time, the operation history acquisition unit 762B acquires the lamp current value and the lamp voltage value detected by the detection device 5.

When the previous turn-on time is smaller than the predetermined time, the period determination unit 766 and the period acquisition unit 767 function as described above.

When it is determined that the previous turn-on time is equal to or greater than the predetermined time, the start control unit 763 acquires the start parameters based on information acquired by the operation history acquisition unit 762B. When it is determined that the previous turn-on time is smaller than the predetermined time, the start control unit 763 acquires the start parameters according to the length of the glow discharge period acquired by the period acquisition unit 767.

The start control unit 763 performs control such that a voltage according to the fan voltage value included in the start parameters is supplied to the fan 61 until the elapsed time determination unit 764 determines that the limited period included in the acquired start parameters has elapsed.

Thereafter, if the elapsed time determination unit 764 determines that the limited period has elapsed, operation control of the fan 61 is performed on the basis of the driving parameters by the normal control unit 765.

As in the above-described projector 1B, the cooling control process which is performed when the light source lamp 411 starts to be turned on includes the cooling control process described in the third embodiment and the cooling control process described in the fourth embodiment. Any cooling control process is performed on the basis of the determination result of the condition determination unit 768.

According to the projector of this embodiment described above, the same effects as the above-described projector 1B can be obtained.

That is, if the turn-on time (the turn-on time before turn-off) of the light source lamp 411 at the time of previous turn-on is equal to or greater than the predetermined time, it is determined that the turn-on and turn-off of the light source lamp 411 are not frequently performed, and the start parameters according to the voltage value of lamp electric power and the operation mode are acquired. If the turn-on time is smaller than the predetermined time, it is determined that turn-on and turn-off are frequently performed, and the start parameters according to the length of the glow discharge period are acquired. The start control unit 763 controls the driving of the fan 61 on the basis of the start parameters, thereby performing effective cooling control according to the state of the light source lamp 411. Therefore, it is possible to more reliably suppress the accumulation of blackening.

As in the above-described fifth and sixth embodiments, the cooling control process which is performed when it is determined that the previous turn-on time is equal to or greater than the predetermined time may be substituted with the cooling control process described in the first or second embodiment.

Eighth Embodiment

Next, an eighth embodiment of the invention will be described.

A projector of this embodiment has the same configuration and function as the above-described projector 1, 1A, or 1B, is provided for the restart (hot restart) of the light source lamp, and has the further configuration and function of adjusting the limited period and the driving information on the basis of the lamp voltage value after insulation breakdown at the time of the start of turn-on. In the following description, the same or substantially same parts as the parts described above are represented by the same reference numerals, and description thereof will not be repeated.

The projector of this embodiment has the same configuration and function as the projector 1B. The storage unit 71B further stores a restart parameter table which is applied when the light source lamp 411 is restarted.

The restart parameter table is set for each operation mode at the time of the restart of the light source lamp 411. In these restart parameter tables, restart parameters are set in associating the lamp voltage value after insulation breakdown of the light source lamp 411 with the limited period and the driving information (fan voltage value).

FIG. 12 is a diagram showing an example of a restart parameter table for restart. FIG. 12 shows a restart parameter table which is applied when the light source lamp 411 is restarted in the high power mode.

For example, in the restart parameter table which is applied when the light source lamp 411 is restarted in the high power mode, as shown in FIG. 12, the restart parameters of the patterns A and B are set for each lamp voltage value after insulation breakdown.

Of these, in the restart parameters of the pattern A, a constant fan voltage value is set, and a different limited period is set for each lamp voltage value. In the pattern A, the higher the lamp voltage value, the shorter the limited period is set.

In the restart parameters of the pattern B, a constant limited period is set, and a different fan voltage value is set for each lamp voltage value. In the pattern B, the higher the lamp voltage value, the higher the fan voltage value is set.

The reason for which the limited period and the fan voltage value are set is as follows.

While, at the time of the restart of the light source lamp 411, an increase in power and temperature is rapidly done, it is necessary to control the operation of the cooling device 6 such that the temperature of the light source lamp 411 does not increase excessively.

The temperature of the light source lamp 411 after insulation breakdown corresponds to the lamp voltage value at a rise time immediately after turn-on and glow discharge. For this reason, it is possible to recognize the temperature of the light source lamp 411 with the lamp voltage value at the rise time as index. For example, when the lamp voltage value is high, it is determined that the temperature of the light source lamp 411 is high.

On the other hand, at the time of the restart, the internal pressure in the light source lamp 411 increases, such that insulation breakdown occurs with difficulty. In order to cope with this situation, during a predetermined period after the restart, the flow rate of cooling air sent to the light source lamp 411 may increase.

Thus, the restart parameters are applied in accordance with the lamp voltage value immediately after glow discharge to control the driving of the cooling device 6 (fan 61), thereby preventing an excessive increase in temperature of the light source lamp 411.

In this projector, when the light source lamp 411 is restarted, the same cooling control process as the above-described cooling control process is performed. This cooling control process is performed when it is determined to be restarted on the basis of the lamp voltage value after insulation breakdown between the electrodes E of the light source lamp 411. When it is determined to be not restarted, the cooling control process described in one of the fifth to seventh embodiments is performed under the above-described condition.

In the cooling control process, after Steps SA1 and S1 described above, in Step S2, the operation history acquisition unit 762B acquires a lamp voltage value after insulation breakdown of the light source lamp 411.

Next, in Step S3, the start control unit 763 references the restart parameter table of the acquired operation mode, and acquires the restart parameters according to the acquired lamp voltage value.

In Step S4, the start control unit 763 controls the operation of the cooling device 6 (fan 61) on the basis of the driving information included in the parameters until the limited period included in the restart parameters elapses.

Thereafter, the same process as Steps S5 to S7 is performed.

According to the projector of this embodiment described above, in addition to the same effects as the above-described projector 1B, the following effects are obtained.

When the light source lamp 411 is restarted, the start control unit 763 adjusts the length of the limited period and the limited flow rate on the basis of the voltage value of lamp electric power after insulation breakdown, and performs control such that the fan voltage having a voltage value according to the limited flow rate is supplied to the fan 61 until the limited period elapses from the restart of the light source lamp 411. Thus, at the time of the restart of the light source lamp 411 at which an increase in power and temperature is rapidly done, it is possible to suppress an excessive increase in temperature of the light source lamp. Therefore, it is possible to stabilize the turn-on of the light source lamp 411, to suppress the occurrence of devitrification and blowing, and to achieve the long lifetime of the light source lamp 411.

Ninth Embodiment

Next, a ninth embodiment of the invention will be described.

While a projector of this embodiment has the same configuration as the above-described projector, in the projector of this embodiment, a first start period immediately after the restart of the light source lamp 411, a second start period corresponding to a rise period of the light source lamp 411 after the first start period, and a normal period, in which cooling air at a set flow rate is sent, after the second start period are provided, and the limited period and driving information of each start period are adjusted. In the following description, the same or substantially same parts as the parts described above are represented by the same reference numerals, and description thereof will not be repeated.

Figure 13:
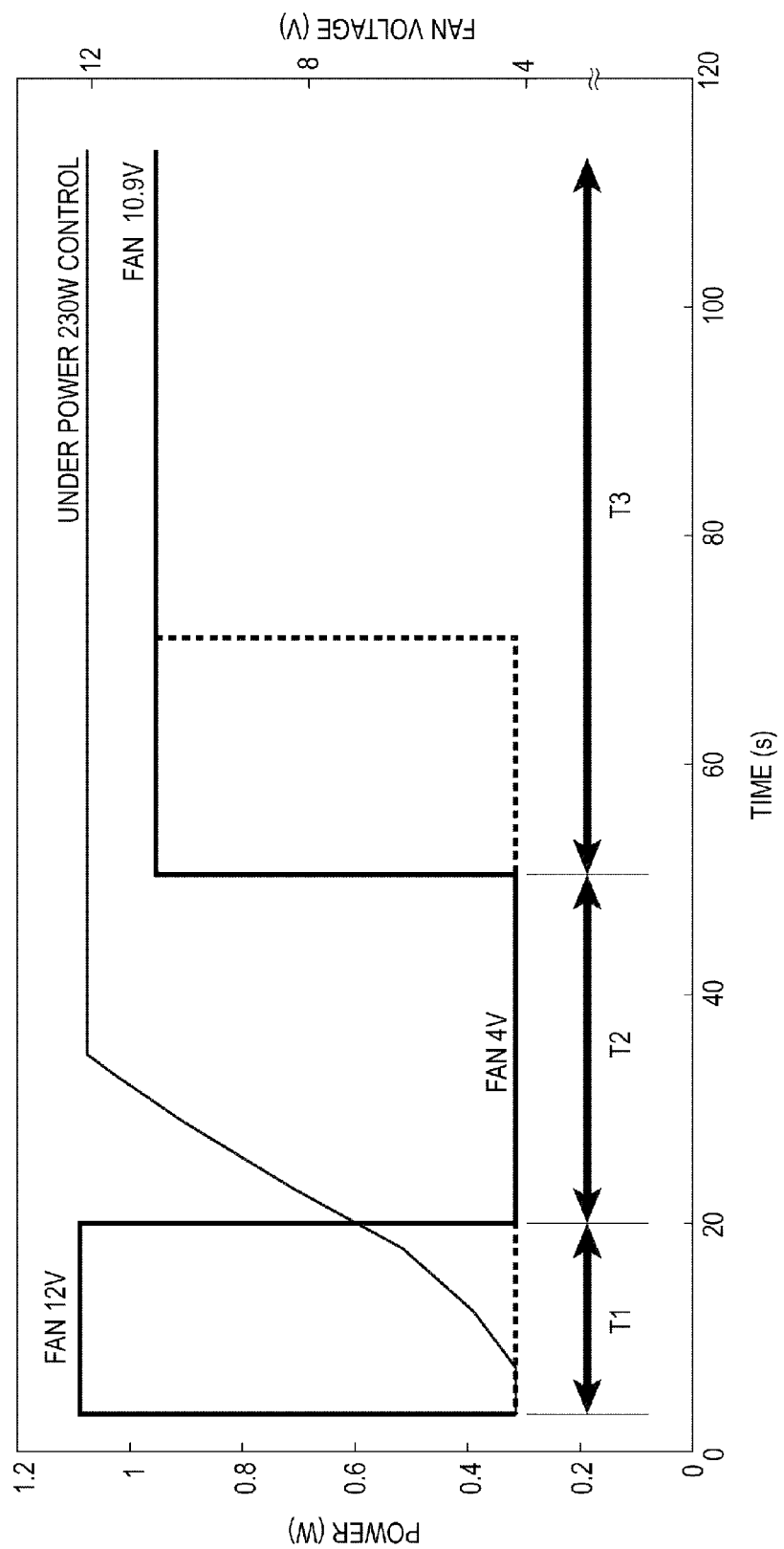
FIG. 13 is a diagram showing the relationship between transition of a power value at the time of the restart of a light source lamp and transition of a fan voltage value according to a ninth embodiment of the invention.

FIG. 13 is a diagram showing the relationship between transition (fine solid line) of a power value at the time of the restart of the light source lamp 411 of this embodiment and transition (bold solid line) of a fan voltage value. In FIG. 13, the transition of the fan voltage value to be applied to the fan 61 by the cooling control process at the time of the restart in the above-described eighth embodiment is indicated by a dotted line.

The projector of this embodiment has the same configuration and function as the above-described projector 1B. The storage unit 71B further stores a first parameter table and a second parameter table which are applied at the time of the restart of the light source lamp 411.

That is, the storage unit 71B stores a first parameter table in which a first parameter to be applied in a first start period T1 shown in FIG. 13 is set, a second parameter table in which a second parameter to be applied in a second start period T2 is set, and a driving parameter table in which driving parameters to be applied in a normal period T3 are set.

Of these, in the first parameter, a comparatively high fan voltage value is set as driving information. In the second parameter, a comparatively high fan voltage value is set as driving information. In these parameters, a limited period according to the state of the light source lamp 411 at the time of the restart is set.

The start control unit 763 controls the fan 61 in accordance with the parameters at the time of the restart of the light source lamp 411, thereby efficiently performing temperature control of the light source lamp 411.

According to the projector of this embodiment described above, in addition to the same effects as the above-described projector, it is possible to perform operation control of the fan 61 in detail, thereby more effectively performing temperature control of the light source lamp 411.

Modifications of Embodiments

The invention is not limited to the above-described embodiments, modifications, improvements, and the like within the scope capable of achieving the object of the invention are included in the invention.

Although in the above-described embodiments, the start control unit 763 acquires the parameters, in which the length of the limited period and the voltage value of the fan voltage are set, from the storage unit, and adjusts the length of the limited period and the limited flow rate which is the flow rate of cooling air sent to the light source lamp 411 within the limited period, the invention is not limited thereto. That is, the parameters may be calculated in accordance with the operation state of the light source lamp 411 by an arithmetic operation.

Although in the above-described embodiments, main control unit 72 or 72B stores the lamp electric power value, the average-rated power ratio, and the lamp voltage value of the light source lamp 411 before turn-off in the storage unit 71 or 71B as the operation history of the light source lamp 411, and the start control unit 763 adjusts the length of the limited period and the limited flow rate in accordance with the lamp electric power value, the average-rated power ratio, and the lamp voltage value, the invention is not limited thereto. That is, other kinds of information may be acquired as an operation history insofar as the information can be used to determine the blackening accumulation state in the light source lamp 411.

Although in the above-described embodiments, the cooling device 6 has the fan 61 which sends cooling air for cooling the light source lamp 411, and the cooling control unit 76, 76A, or 76B applies the fan voltage value for driving the fan 61 to the power supply device 3, the invention is not limited thereto. For example, the cooling device may include regulation unit, such as a louver, which adjusts the flow rate of cooling air sent to the light source lamp 411, and the cooling control unit may control the operation of the regulation unit, thereby adjusting the flow rate of cooling air sent to the light source lamp 411. In this case, the fan 61 may be driven with a constant fan voltage value or may be driven along with driving control of the fan described above. In this case, it is possible to adjust the flow rate to be sent to the light source lamp 411 in more detail.

Although in the above-described embodiments, the cooling device 6 sends cooling air as a cooling fluid, the invention is not limited thereto. For example, a cooling solvent, such as ethylene glycol, may be used as a cooling fluid to cool the light source lamp 411 insofar as the insulation of the light source lamp 411 is appropriately made.

Although in the above-described embodiments, the fan 61 is driven on the basis of the driving information set in the parameters for the limited period, the invention is not limited thereto. That is, the fan 61 may be stopped.

Although in the above-described embodiments, the voltage value of the fan voltage is constant for each limited period, the invention is not limited thereto. That is, the voltage value may be changed. For example, the voltage value may increase successively or in a stepwise manner in the second half of the limited period, and when the limited period ends, the fan voltage may be applied such that cooling air at the set flow rate is sent.

Although in the fifth to seventh embodiments, the predetermined condition refers to the cumulative turn-on time of the light source lamp 411, the lamp voltage value at the time of previous turn-off, and the previous turn-on time, the invention is not limited thereto. That is, the cooling control process to be performed may be switched under other conditions.

Instead of switching the cooling control process to be performed under the conditions, the factor for blackening to be considered may be weighted in accordance with the state of the light source lamp 411, and at least one of the limited period and the limited flow rate may be adjusted on the basis of the weight.

Although in the above-described embodiments, the parameters of the pattern A in which the voltage value of the fan voltage is constant and the parameters of the pattern B in which the length of the limited period is constant are set in the parameter table, the invention is not limited thereto. That is, the parameters of only one of the patterns A and B may be set. The parameters are not limited to the above-described parameters, and parameters may be set such that the length of the limited period and the fan voltage value (consequently, the limited flow rate) differ in accordance with the lamp electric power value, the average-rated power value, and the lamp voltage value before turn-off.

INDUSTRIAL APPLICABILITY

The invention can be used in a projector, and in particular, can be appropriately used in a projector having a light source lamp in which a pair of electrodes and a discharge material are sealed.

REFERENCE SIGNS LIST 1, 1A, 1B: projector, 6: cooling device (cooling unit), 61: fan, 71, 71A, 71B: storage unit, 74: lighting control unit, 411: light source lamp, 763: start control unit (start control unit), 765: normal control unit (normal control unit), E (E1, E2): electrode, S: discharge space.

The entire disclosure of Japanese Patent Application No. 2011-003363, filed Jan. 11, 2011 is expressly incorporated by reference herein.

The invention claimed is:

1. A projector comprising:
a light source lamp;
a lighting control unit adapted to supply a lamp electric power to turn on the light source lamp;
a cooling unit adapted to send a cooling fluid to cool the light source lamp; and
a start control unit adapted to, from the start of turn-on of the light source lamp until a predetermined period elapses, adjust at least one of the length of the predetermined period and a limited flow rate, which is the flow rate of the cooling fluid per unit time sent from the cooling unit within the predetermined period, on the basis of an operation history of the light source lamp before previous turn-off to control the operation of the cooling unit.

2. The projector according to claim 1, further comprising:
a normal control unit adapted to control the cooling unit such that the cooling fluid at a set flow rate set in advance in accordance with lamp electric power is sent to the light source lamp after the predetermined period has elapsed.

3. The projector according to claim 1,
wherein the start control unit adjusts at least one of the length of the predetermined period and the limited flow rate in accordance with the operation history and lamp electric power supplied to the light source lamp.

4. The projector according to claim 3,
wherein the operation history is the power value of lamp electric power supplied to the light source lamp before the light source lamp is turned off.

5. The projector according to claim 3,
wherein the operation history is the ratio of a rated power value of the light source lamp and an average power value of lamp electric power supplied to the light source lamp before the light source lamp is turned off.

6. The projector according to claim 3,
wherein the operation history is the voltage value of lamp electric power supplied to the light source lamp before the light source lamp is turned off.

7. The projector according to claim 1,
wherein the light source lamp has a discharge space in which a pair of electrodes and a discharge material are sealed,
after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes, and
the start control unit adjusts at least one of the length of the predetermined period and the limited flow rate in accordance with the length of the glow discharge period.

8. The projector according to claim 3, wherein the light source lamp has a discharge space in which a pair of electrodes and a discharge material are sealed,
after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes, and
the cooling control unit adjusts at least one of the length of the predetermined period and the limited flow rate in accordance with lamp electric power if a cumulative turn-on time of the light source lamp is smaller than a predetermined time, and adjusts at least one of the length of the predetermined period and the limited flow rate in accordance with the length of the glow discharge period if the cumulative turn-on time is equal to or greater than the predetermined time.

9. The projector according to claim 3, wherein the light source lamp has a discharge space in which a pair of electrodes and a discharge material are sealed,
after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes, and
the cooling control unit adjusts at least one of the length of the predetermined period and the limited flow rate in accordance with lamp electric power if the voltage value of lamp electric power supplied to the light source lamp before the light source lamp is turned off is lower than a predetermined value, and adjusts at least one of the length of the predetermined period and the limited flow rate in accordance with the length of the glow discharge period if the voltage value is equal to or greater than the predetermined value.

10. The projector according to claim 3, wherein the light source lamp has a discharge space in which a pair of electrodes and a discharge material are sealed,
after insulation breakdown in which insulation between a pair of electrodes is broken due to lamp electric power supplied by the lighting control unit, the light source lamp is turned on through a glow discharge period in which glow discharge is generated between a pair of electrodes and an arc discharge period in which arc discharge is generated between a pair of electrodes, and
the cooling control unit adjusts at least one of the length of the predetermined period and the limited flow rate in accordance with lamp electric power if the turn-on time of the light source lamp immediately before the light source lamp is turned off is equal to or greater than a predetermined time, and adjusts at least one of the length of the predetermined period and the limited flow rate in accordance with the length of the glow discharge period if the turn-on time is smaller than the predetermined time.

11. The projector according to claim 1, wherein the light source lamp has a discharge space in which a pair of electrodes and a discharge material are sealed, and
the start control unit adjusts at least one of the length of the predetermined period and the limited flow rate on the basis of, as the operation history, the voltage value of lamp electric power supplied to the light source lamp after insulation breakdown in which insulation is broken between a pair of electrodes.

12. The projector according to claim 1, further comprising:
a storage unit for storing the operation history of the light source lamp in association with driving information of the cooling unit according to the length of the predetermined period and the limited flow rate, wherein
the start control unit acquires the length of the predetermined period and the driving information according to the operation history of the light source lamp from the storage unit, and puts the cooling unit into operation.

13. The projector according to claim 12, wherein
the cooling unit includes a fan which sends the cooling fluid, and
the driving information is a fan voltage value which is supplied to the fan.

* * * * *